United States Patent [19]

Maycock et al.

[11] Patent Number: 4,859,759
[45] Date of Patent: Aug. 22, 1989

[54] SILOXANE CONTAINING BENZOTRIAZOLYL/TETRAALKYLPIPERIDYL SUBSTITUENT

[75] Inventors: William E. Maycock, Marietta; Ronald S. Nohr, Roswell; J. Gavin MacDonald, Decatur, all of Ga.

[73] Assignee: Kimberly-Clark Corporation, Neenah, Wis.

[21] Appl. No.: 181,463

[22] Filed: Apr. 14, 1988

[51] Int. Cl.$^4$ .............................................. C08G 77/04
[52] U.S. Cl. ........................................ 528/27; 528/28; 546/14; 548/110
[58] Field of Search .................... 546/14; 548/110; 528/27, 28

[56] References Cited

U.S. PATENT DOCUMENTS

| | | | |
|---|---|---|---|
| Re. 31,342 | 8/1983 | Holt et al. | 542/427 |
| Re. 31,343 | 8/1983 | Holt et al. | 546/188 |
| Re. 32,514 | 10/1987 | Steklenski | 524/32 |
| 3,004,896 | 10/1961 | Heller et al. | 167/90 |
| 3,055,896 | 9/1962 | Boyle et al. | 260/249.5 |
| 3,072,585 | 1/1963 | Miliones | 260/22 |
| 3,074,910 | 1/1963 | Dickson | 260/45.75 |
| 3,189,615 | 6/1965 | Heller et al. | 260/308 |
| 3,230,194 | 1/1966 | Boyle | 260/45.8 |
| 3,253,921 | 5/1966 | Sawdey | 96/73 |
| 3,360,421 | 12/1967 | Sands | 161/63 |
| 3,629,308 | 12/1971 | Bailey et al. | 260/448.2 |
| 3,766,115 | 10/1973 | Sands | 260/29.1 |
| 3,867,188 | 2/1975 | Campbell et al. | 117/138.8 |
| 3,929,509 | 12/1975 | Taskier | 136/146 |
| 3,973,068 | 8/1976 | Weber | 28/198 |
| 3,983,132 | 9/1976 | Strobel | 260/308 |
| 4,041,044 | 8/1977 | White | 260/308 |
| 4,070,218 | 1/1978 | Weber | 156/167 |
| 4,087,399 | 5/1978 | Hamada et al. | 260/37 |
| 4,096,242 | 6/1978 | Strobel | 424/59 |
| 4,105,569 | 8/1978 | Crossfield | 252/8.6 |
| 4,127,586 | 11/1978 | Rody et al. | 260/308 |
| 4,129,521 | 12/1978 | Strobel | 252/403 |
| 4,150,013 | 4/1979 | Punderson | 260/42.26 |
| 4,156,674 | 5/1979 | Sumimura | 260/37 |
| 4,210,578 | 7/1980 | Rody et al. | 528/38 |
| 4,226,763 | 10/1980 | Dexter et al. | 260/45.8 |
| 4,278,590 | 7/1981 | Dexter et al. | 260/45.8 |
| 4,283,327 | 8/1981 | Dexter et al. | 260/45.8 |
| 4,294,963 | 10/1981 | Rody | 544/198 |
| 4,299,926 | 11/1981 | Rody et al. | 525/55 |
| 4,314,933 | 2/1982 | Berner | 260/45 |
| 4,315,848 | 2/1982 | Dexter et al. | 260/45.8 |
| 4,340,533 | 7/1982 | Rody | 524/99 |
| 4,344,876 | 8/1982 | Berner | 524/91 |
| 4,348,524 | 9/1982 | Karrer et al. | 546/187 |
| 4,360,675 | 11/1982 | Nikles | 546/216 |
| 4,377,690 | 3/1983 | Moser | 546/19 |
| 4,383,863 | 5/1983 | Dexter et al. | 106/125 |
| 4,396,769 | 8/1983 | Ferreira et al. | 546/188 |
| 4,412,021 | 10/1983 | Karrer | 524/102 |
| 4,414,393 | 11/1983 | Dexter et al. | 548/260 |
| 4,419,472 | 12/1983 | Berner et al. | 524/102 |
| 4,419,512 | 12/1983 | Karrer | 544/70 |
| 4,426,203 | 1/1984 | Abel et al. | 8/138 |
| 4,426,471 | 1/1984 | Berner | 524/91 |
| 4,426,472 | 1/1984 | Berner | 524/99 |
| 4,444,563 | 4/1984 | Abel | 8/588 |
| 4,446,090 | 5/1984 | Lovgren et al. | 264/211 |
| 4,447,511 | 5/1984 | Dexter et al. | 430/15 |
| 4,452,884 | 6/1984 | Leppard | 430/551 |
| 4,465,765 | 8/1984 | Leppard et al. | 430/512 |
| 4,472,547 | 9/1984 | Malherbe | 524/98 |
| 4,477,614 | 10/1984 | Dexter et al. | 524/91 |
| 4,480,009 | 10/1984 | Berger | 428/447 |
| 4,481,315 | 11/1984 | Rody et al. | 524/89 |
| 4,499,149 | 2/1985 | Berger | 428/447 |
| 4,500,659 | 2/1985 | Kroupa et al. | 523/213 |
| 4,511,596 | 4/1985 | Berner | 427/44 |
| 4,517,283 | 5/1985 | Leppard et al. | 430/512 |
| 4,518,679 | 5/1985 | Leppard et al. | 430/372 |
| 4,518,688 | 5/1985 | Leppard et al. | 430/551 |
| 4,528,374 | 7/1985 | Nikles | 546/186 |
| 4,532,279 | 7/1985 | Karrer | 524/102 |
| 4,535,113 | 8/1985 | Foster et al. | 524/262 |
| 4,554,310 | 11/1985 | Wengrovius et al. | 524/715 |
| 4,556,714 | 12/1985 | Karrer | 546/190 |
| 4,563,190 | 1/1986 | Topfl | 8/524 |
| 4,569,997 | 2/1986 | Karrer | 546/19 |
| 4,578,414 | 3/1986 | Sawyer et al. | 524/310 |
| 4,584,265 | 4/1986 | Leppard et al. | 430/551 |
| 4,585,830 | 4/1986 | Sweet | 524/862 |
| 4,587,346 | 5/1986 | Winter et al. | 548/260 |
| 4,590,268 | 5/1986 | Karrer | 544/121 |
| 4,609,698 | 9/1986 | Karrer et al. | 524/99 |
| 4,629,682 | 12/1986 | Leppard et al. | 430/372 |
| 4,642,350 | 2/1987 | Davatz et al. | 548/260 |
| 4,645,691 | 2/1987 | Ona et al. | 427/180 |
| 4,652,489 | 3/1987 | Cross et al. | 428/337 |
| 4,659,777 | 4/1987 | Riffle et al. | 525/100 |
| 4,661,594 | 4/1987 | Rasberger et al. | 546/22 |
| 4,672,005 | 6/1987 | Dyer | 428/474.4 |
| 4,675,352 | 6/1987 | Winter et al. | 524/91 |
| 4,698,388 | 10/1987 | Ohmura et al. | 525/88 |

FOREIGN PATENT DOCUMENTS

0071349A2 2/1982 European Pat. Off. .

OTHER PUBLICATIONS

A. J. Sabia and R. B. Metzler, *Nonwovens, Ind.*, 14, 16 (1983).

(List continued on next page.)

Primary Examiner—Melvyn I. Marquis
Attorney, Agent, or Firm—William E. Maycock

[57] ABSTRACT

A siloxane which contains at least one benzotriazolyl/-tetraalkylpiperidyl group, which siloxane can be represented by the general formula, S-Z, in which S represents a siloxane moiety and Z represents a pendant benzotriazolyl/tetraalkylpiperidyl group attached by means of a divalent connecting group to a silicon atom.

The compounds are useful as additives for the preparation of surface-segregatable, melt-extrudable thermoplastic compositions. The compositions, in turn, are useful for the preparation of fibers and films by melt extrusion, which fibers and films have enhanced stability to degradation by actinic radiation.

72 Claims, No Drawings

OTHER PUBLICATIONS

*Chem. Abstr.*, 84:91066z (1976).
*Chem. Abstr.*, 77:89559z (1972).
R. H. Somani and M. T. Shaw, *Macromolecules*, 14, 886 (1981).
S. N. Pandit et al., *Polymer Compos.*, 2, 68 (1981).
"SILWET® Surface Active Copolymers", Bulletin SUI-394A, 7/85-5M, Union Carbide Corporation.
"Silicon Compounds Register and Review", Petrarch Systems Silanes and Silicones, pp. 253-300, Petrarch Systems.
"Tegopren® Silicone Surfactants—Products, Data, Information", Th. Goldschmidt AG.
"Surfactants at Th. Goldschmidt AG", Th. Goldschmidt AG.
"Goldschmidt Informiert...", 1/82, Nr. 56, Mar. 1982, English Edition, Th. Goldschmidt AG.
"Goldschmidt Informiert...", 4/84, No. 63, Dec. 1984, Functional Oligomers, Th. Goldschmidt AG.
"SILWET® Surfactants", Bulletin SC-877, P8-2538, 2/88-10M, Union Carbide Corporation.

SILOXANE CONTAINING BENZOTRIAZOLYL/TETRAALKYLPIPERIDYL SUBSTITUENT

CROSS-REFERENCES TO RELATED APPLICATIONS

Surface-segregatable, melt-extrudable thermoplastic compositions which include as additives the compositions of the present invention are described and claimed in copending and commonly assigned application Ser. No. 07/181,359, entitled SURFACE-SEGREGATABLE, MELT-EXTRUDABLE THERMOPLASTIC COMPOSITION, filed of even date in the names of Ronald S. Nohr and J. Gavin MacDonald. A method of stabilizing such compositions under melt-extrusion conditions, and the stabilized compositions, are described and claimed in copending and commonly assigned application Ser. No. 07/181,352, entitled STABILIZED SILOXANE-CONTAINING MELT-EXTRUDABLE THERMOPLASTIC COMPOSITIONS, filed of even date in the names of Ronald S. Nohr and J. Gavin MacDonald. Novel benzotriazolyl-substituted siloxanes useful as additives in such surface-segregatable, melt-extrudable thermoplastic compositions and which are related to the compositions of the present invention are described and claimed in copending and commonly assigned application Ser. No. 07/181,624, entitled BENZOTRIAZOLYL-SUBSTITUTED SILOXANES, filed of even date in the names of Ronald S. Nohr, J. Gavin MacDonald, and William E. Maycock. Novel 2,2,6,6-tetraalkylpiperidyl-substituted polysiloxanes also useful as additives in such surface-segregatable, melt-extrudable thermoplastic compositions and related to the compositions of the present invention are described and claimed in copending and commonly assigned application Ser. No. 07/181,623, entitled TETRAALKYLPIPERIDYL-SUBSTITUTED POLYSILOXANES, filed of even date in the names of Ronald S. Nohr, J. Gavin MacDonald, and William E. Maycock. The use of a post-formation, gentle heat treatment in the formation of nonwoven webs from such surface-segregatable, melt-extrudable thermoplastic compositions is described and claimed in copending and commonly assigned application Ser. No. 07/181,282, entitled METHOD OF FORMING A NONWOVEN WEB FROM A SURFACE-SEGREGATABLE THERMOPLASTIC COMPOSITION, filed of even date in the names of Ronald S. Nohr and J. Gavin MacDonald. The use of a heated compaction roll in the formation of spubonded nonwoven webs from such surface-segregatable, melt-extrudable thermoplastic compositions is described and claimed in copending and commonly assigned application Ser. No. 07/181,601, entitled METHOD OF FORMING A NONWOVEN WEB FROM A SURFACE-SEGREGATABLE THERMOPLASTIC COMPOSITION filed of even date in the names of Ronald S. Nohr and J. Gavin MacDonald.

BACKGROUND OF THE INVENTION

The present invention relates to novel siloxanes. More particularly, the present invention relates to a siloxane which contains at least one benzotriazolyl/tetraalkylpiperidyl substituent, i.e., a single substituent which contains both a benzotriazolyl group and a tetraalkylpiperidyl group.

Prior to the discovery of the surface-segregatable, melt-extrudable thermoplastic compositions described in co-pending and commonly assigned application Ser. No. 07/181,359, in which the siloxanes of the present invention are useful, the only practical way to stabilize polymers against actinic radiation has been to incorporate throughout the bulk of the polymer a stabilizing additive, i.e., an additive which either absorbs ultraviolet radiation or inhibits degradation. See, by way of illustration only, U.S. Pat. Nos. 4,087,399 to M. Hamada et al., 4,156,674 to S. Sumimura, and 4,554,310 to J. H. Wengrovius and L. W. Niedrach, which relate to the incorporation of benzotriazoles in polymers, and U.S. Pat. Nos. 4,299,926 to J. Rody and M. Rasberger, 4,294,963 to J. Rody, 4,661,594 to M. Rasberger et al., 4,629,682 to D. G. Leppard and J. Rody, 4,426,472 to G. Berner, and 4,426,471 to G. Berner, among others, which relate to the incorporation of tetraalkylpiperidines in polymers. Even though efficient stabilizers may be used, such as the benzotriazole and tetraalkylpiperidine stabilizers disclosed in the foregoing patents, a bulk incorporation procedure does not concentrate the stabilizer at or near the surface where it is most needed. Such shortcoming generally was overcome only by using very high levels of additive. This approach, however, can be prohibitively expensive and also can lead to thermal degradation, processing, and/or polymer performance problems associated with such very high levels of additive.

As noted above, novel benzotriazolyl-substituted, siloxanes are described in application Ser. No. 07/181,624 and novel tetraalkylpiperidyl-substituted siloxanes are described in application Ser. No. 07/181,623. Such compounds can be incorporated into thermoplastic polymers as described in said application Ser. No. 07/181,359. The resulting compositions exhibit improved stability upon exposure to actinic radiation. The first type of compounds absorbs ultraviolet radiation, while the second type of compounds inhibits degradation induced by actinic radiation. Thus, incorporation of both types of compounds into a single thermoplastic composition is one solution to the above-described shortcoming of past polymer stabilization practices. Another solution, and the one addressed by the present invention, is to incorporate as an additive a siloxane of the present invention which rapidly segregates to the surface in a controllable manner and is both an efficient absorber of ultraviolet radiation and an effective degradation inhibitor.

It may be noted at this point that the benzotriazolyl portions of the compounds of the present invention are known. See, for example, U.S. Pat. Nos. 3,004,896 to H. Heller et al., 3,055,896 to R. J. Boyle and J. P. Milionis, 3,072,5585 to J. P. Milionis and W. B. Hardy, 3,074,910 to D. M. Dickson, 3,189,615 to H. Heller et al., 3,230,194 to R. J. Boyle, 3,253,921 to G. W. Sawdey, 3,983,132 to A. F. Strobel, 4,041,044 to H. I. White, 4,096,242 to A. F. Strobel, 4,127,586 to J. Rody and H. Heller, 4,129,521 to A. F. Strobel, 4,226,763 to M. Dexter and R. A. E. Winter, 4,283,327 to M. Dexter and R. A. E. Winter, 4,315,848 to M. Dexter and R. A. E. Winter, 4,383,863 to M. Dexter and R. A. E. Winter, 4,414,393 to M. Dexter and R. A. E. Winter, 4,447,511 to M. Dexter and R. A. E. Winter, 4,477,614 to M. Dexter and R. A. E. Winter, 4,587,346 to R. A. E. Winter and R. E. Detlefsen, 4,642,350 to A. Davatz and T. Somlo, and 4,675,352 to R. A. E. Winter and R. E. Detlefsen.

Moreover, the tetraalkylpiperidyl portions of the compounds of the present invention also are known. In addition to the patents cited above, see, for example, U.S. Pat. Nos. 4,278,590 to M. Dexter and R. A. E. Winter, 4,299,926 to J. Rody and M. Rasberger, 4,348,524 to F. Karrer and P. Moser, 4,472,547 to R. F. Malherbe, 4,511,596 to G. Berner, 4,569,997 to F. Karrer, 4,590,268 to F. Karrer, Re. 31,342 to B. Holt and D. F. Randell, and Re. 31,343 to B. Holt and D. R. Randell. See also U.S. Pat. Nos. 4,294,963 to J. Rody, 4,314,933 to G. Berner, 4,340,533 to J. Rody, 4,344,876 to G. Berner, 4,360,675 to E. Nikles, 4,377,690 to P. Moser, 4,396,769 to A. L. Ferreira and R. E. Stahlbush, 4,412,021 to F. Karrer, 4,419,472 to G. Berner et al., 4,419,512 to F. Karrer, 4,452,884 to D. G. Leppard, 4,465,765 to D. G. Leppard and J. Rody, 4,517,283 to D. G. Leppard and J. Rody, 4,518,679 to D. G. Leppard and J. Rody, 4,518,688 to D. G. Leppard and J. Rody, 4,528,374 to E. Nikles, 4,532,279 to F. Karrer, 4,556,714 to F. Karrer, 4,584,265 to D. G. Leppard and J. Rody, and 4,609,698 to F. Karrer and J. Rody.

One reference is known which discloses compounds having at least one benzotriazolyl group and at least one polyalkylpiperidyl group in the same molecule. See U.S. Pat. No. 4,481,315 to J. Rody and M. Slongo.

As noted in application Ser. No. 07/181,359, polymers are used widely throughout the world to make a variety of products which include blown and cast films, extruded sheets, injection molded articles, foams, blow molded articles, extruded pipe, monofilaments, and nonwoven webs. Some of such polymers, such as polyolefins, have surface properties, such as hydrophobicity and a susceptibiltiy to degradation by ultraviolet radiation, which for many uses are either a positive attribute or at least not a disadvantage.

There are a number of uses for polyolefins, however, where the surface characteristics of the polymer either limit their usefulness or require some effort to modify the surface characteristics of the shaped articles made therefrom. Methods of affecting the surface characteristics of shaped articles made from polyolefins and other polymers are known. Representative examples of a number of such methods are described in the paragraphs which follow.

The incorporation of a surfactant in a polymer which is to be melt-processed is described in U.S. Pat. Nos. 3,973,068 and 4,070,218 to R. E. Weber. In that case, the surfactant must be forced to the surface of the fibers from which the web is formed. This typically is done by heating the web on a series of steam-heated rolls or "hot cans". This process, called "blooming", is expensive and still has the disadvantage of ready removal of the surfactant by aqueous media. Moreover, the surfactant has a tendency to migrate back into the fiber which adversely affects shelf life, particularly at high storage temperatures. In addition, it is not possible to incorporate in the polymer levels of surfactant much above 1 percent by weight because of severe processability problems; surfactant levels at the surface appear to be limited to a maximum of about 0.33 percent by weight. Most importantly, the blooming process results in web shrinkage in the cross-machine direction and a significant loss in web tensile strength.

U.S. Pat. No. 4,578,414 to L. H. Sawyer and G. W. Knight describes wettable olefin polymer fibers. The fibers are formed from a composition comprising a polyolefin resin and one or more defined surface-active agents. Such agents may be present in an amount of from about 0.01 to about 5 percent by weight. The surface-active agents can be (1) an alkoxylated alkyl phenol in combination with a mixed mono-, di-, and/or triglyceride; (2) or a polyoxyalkylene fatty acid ester; or (3) a combination of (2) with any part of (1). The preferred polyolefin is polyethylene, and all of the examples employed an ethylene/1-octene copolymer, the latter apparently being a minor component. The surface-active agents are stated to bloom to the fabricated fiber surfaces where at least one of the surface-active agents remains partially embedded in the polymer matrix. The patent further states that the permanence of wettability can be controlled through the composition and concentration of the additive package.

Polysiloxane/polyoxazoline block copolymers are disclosed in U.S. Pat. No. 4,659,777 to J. S. Riffle and I. Yilgor. The copolymers are stated to be useful as surface-modifying additives for base polymers. Such use apparently has primary reference to personal care products where the surface properties to be imparted include glossiness, smoothness, and lubricity. However, incorporation of the copolymers into fibers is stated to impart surface stain resistance, antistatic properties, flame retardancy, and wettability by both polar and nonpolar solvents. Such incorporation preferably is in the range of from about 1 to 5 parts by weight. Suitable base polymers include some vinyl polymers, acrylate polymers, polyurethanes, cellulose derivatives, and polyethylene, polypropylene, ethylenepropylene copolymers, and copolymers of ethylene with, for example, vinyl acetate. However, the single example illustrating incorporation of the disclosed copolymers into a base polymer employed as the base polymer poly(vinyl chloride), and the resulting mixture was used to cast films from solution.

U.S. Pat. No. 4,672,005 to M. E. Dyer describes a process for improving the hygroscopic, soil release, and other surface properties of a polymer substrate. The process involves contacting the substrate with an aqueous mixture containing a water-soluble vinyl monomer and a hydrophobic vinyl monomer. Polymerization of the water-soluble vinyl monomer then is initiated by a polymerization initiator, thereby forming a vinyl polymer on the surface of the polymer substrate.

U.S. Pat. No. 4,698,388 to H. Ohmura et al. describes a method for modifying the surface of a polymer material by means of a block copolymer. The block copolymer consists of a hydrophilic polymer portion formed from a vinyl monomer and a polymer portion which is compatible with the polymer material, also formed from a vinyl monomer. The block copolymer is added to the polymer material by, for example, coating the material with a solution or suspension of the block copolymer, mixing the block copolymer with the polymer material during formation of the article, forming a film from the block copolymer which then is melt-pressed or adhered to the surface of the polymer material, and coating the surface of the polymer material with powdered block copolymer.

Polymer compositions having a low coefficient of friction are described by U.S. Pat. No. Re. 32,514 to D. J. Steklenski. The compositions comprise a blend of at least 80 percent by weight of a polymer and at least 0.35 percent by weight of a crosslinked silicone polycarbinol. The polymer preferably is a blend of cellulose nitrate and a hydrophobic acrylate polymer. The silicone polycarbinol in general is a hydroxy-terminated polysiloxane or hydroxy-substituted polysiloxane. The compositions typically are prepared by dissolving the polymer or polymer blend, silicone polycarbinol, and crosslinking agent in a suitable solvent and casting a film from which the solvent is allowed to evaporate.

Canadian Patent No. 1,049,682 describes the inclusion in a thermoplastic polymer of from 0.1 to 10 percent by weight of a carboxy-functional polysiloxane. Suitable thermoplastic polymers include polyolefins. Such inclusion is stated to enhance the properties or characteristics of the thermoplastic polymer in one or more ways. By way of illustration, products or articles made from the polymer mixture were stated to have self-lubricating properties and increased resistance to wear. For molded articles, less friction during transfer, injection or extrusion molding was observed, and better release of parts from the molds was obtained. See, also, German Published Patent Application (Offenlegungschrift) No. 2,506,667 [Chem. Abstr., 84:91066z (1976)].

Other, similar references which may be of interest include R. H. Somani and M. T. Shaw, *Macromolecules*, 14, 886 (1981), which describes the miscibility of polydimethylsiloxane in polystyrene; and S. N. Pandit et al., *Polym. Compos.*, 2, 68 (1981), which reports the use of a vinyltriethoxysilane polymer as a coupling agent in glass fiber-reinforced polypropylene.

It also may be noted that polysiloxanes have been utilized in the production of nonwoven webs or fabrics, or products made therefrom, as illustrated by the references which follow.

U.S. Pat. No. 3,360,421 to S. Sands describes a bonded nonwoven backing material having perforate selvage which is used in the manufacture of carpet. In the production of the nonwoven backing material, a nonwoven web is produced from a polyolefin such as polyethylene or polypropylene. The resulting web then is subjected to bonding conditions, followed by applying to the web a lubricant which can be, among other things, methyl hydrogen polysiloxane and dimethyl polysiloxane.

A finish composition for application to a continuous filament polypropylene sheet is disclosed in U.S. Pat. No. 3,766,115 to S. Sands. The composition comprises a mixture of two polysiloxane components, the first of which is a dyeable component comprising a primary or secondary aminoalkyl- or aminoalkoxyalkylpolysiloxane fluid having an amine functionality in the range of 4–7 percent and being substantially free of other reactive groups. The second component is a lubricant component comprising a polydialkyl/arylsiloxane fluid having hydroxy end groups and being substantially free of other reactive groups. The polypropylene sheet typically is a spunbonded sheet made from isotactic polypropylene.

U.S. Pat. No. 3,867,188 to P. E. Campbell and J. G. Kokoszka relates to a spunbonded nonwoven fabric which is especially useful as a carpet backing. The fabric has on it a silicone-glycol copolymer having the general formula:

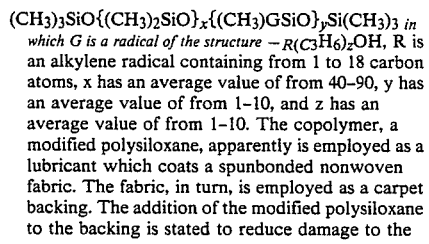

in which G is a radical of the structure $-R(C_3H_6)_zOH$, R is an alkylene radical containing from 1 to 18 carbon atoms, x has an average value of from 40–90, y has an average value of from 1–10, and z has an average value of from 1–10. The copolymer, a modified polysiloxane, apparently is employed as a lubricant which coats a spunbonded nonwoven fabric. The fabric, in turn, is employed as a carpet backing. The addition of the modified polysiloxane to the backing is stated to reduce damage to the backing which results from the tufting process used to manufacture the carpet.

U.S. Pat. No. 3,929,509 to H. T. Taskier describes a hydrophilic microporous film which is useful as a battery separator. The film comprises a hydrophobic microporous film coated with a silicone glycol copolymer surfactant, preferably at a level of from 2 to 20 percent by weight, based on the uncoated film. In preferred embodiments, the surfactant coating comprises a mixture of a silicone glycol copolymer surfactant and a second surfactant which preferably is an imidazoline tertiary amine. The silicone glycol copolymer surfactant preferably is a polyoxyethylene polymethylsiloxane.

A yarn finish formulation is disclosed in U.S. Pat. No. 4,105,569 to R. J. Crossfield. In preferred embodiments, the formulation contains a hydrocarbon-soluble, long molecular chain polymeric viscosity improver, such as polyisobutylene, and a polysiloxane. Preferably, the polysiloxane is an alkoxylated polysiloxane, such as a dimethylpolysiloxane with substituted polyethylene glycol or polypropylene glycol side chains or mixed polyethylene/polypropylene glycol side chains.

U.S. Pat. No. 4,563,190 to R. Töpfl describes a siloxane/oxyalkylene copolymer as an optional component of a dyeing assistant for dyeing or printing polyamide fiber material with anionic dyes. See also U.S. Pat. Nos. 4,444,563 to H. Abel and 4,426,203 to H. Abel and J. Oxe.

U.S. Pat. No. 4,645,691 to I. Ona and M. Ozaki describes a method for treating materials with organopolysiloxane compounds. The method involves applying to the material a composition containing a silicone compound which has one or more alkoxysilylalkyl groups and one or more polyoxyalkylene groups. The materials to be treated preferably are fibers and fiber-containing materials.

For a limited review of similar applications of silicones, see A. J. Sabia and R. B. Metzler, *Nonwovens Ind.*, 14, 16 (1983). Also note British Pat. No. 1,273,445 [Chem. Abstr., 77: 89559z (1972)], which describes the use of a block polysiloxane, among other materials, in the preparation of a leather substitute.

It may be noted that the above review briefly discusses polysiloxanes which have been modified by inclusion of a poly(oxyalkylene) moiety; such modified polysiloxanes can be employed in the composition of the present invention as an additive.

Additionally, polysiloxanes have been used in the manufacture of films. For example, U.S. Pat. No. 4,652,489 describes a sealable, opaque polyolefinic multi-layer film. The film is composed of a polypropylene base layer, a nonsealable surface layer, and a sealable surface layer. The nonsealable layer is a combination of a propylene homopolymer and a slip agent which preferably is a polydiorganosiloxane. The polydiorganosiloxane is used in an amount of from about 0.3 to about 2.5 percent by weight and preferably comprises a polymethylphenylsiloxane or a polydimethylsiloxane.

Finally, several references are known which are or may be of interest in relation to the additive when it contains disubstituted siloxane groups. Such references are described below.

Siloxane-oxyalkylene block copolymers are disclosed in U.S. Pat. No. 3,629,308 to D. L. Bailey and A. S. Pater. The copolymers are stated to be particularly useful as a foam stabilizer in the production of polyurethane resin foams. The copolymers are represented by the formula:

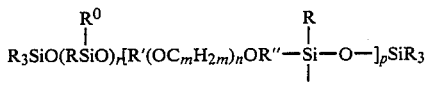

in which R is a monovalent hydrocarbon group, $R^O$ is hydrogen or a monovalent hydrocarbon group, R' is hydrogen or a monovalent hydrocarbon group, R" is a divalent hydrocarbon group, r has a value of at least 0, m is an integer that has a value of at least 2, n is a number that has a value of at least 1 (preferably at least 4), p is a number that has a value of at least 1, there are not more than three hydrogen atoms represented by $R^0$ in the copolymer (preferably less than one or none), and at least 25 weight-percent of the groups represented by $(OC_mH_{2m})$ are oxyethylene groups.

U.S. Pat. No. 4,150,013 to J. O. Punderson describes melt-processible tetrafluoroethylene copolymers containing organopolysiloxanes which are useful as wire insulation coatings. The organopolysiloxane is present in an amount of between about 0.2 and 5 percent by weight, based on the weight of the resulting copolymer composition. Representative organopolysiloxanes include polyphenylmethylsiloxane, polydimethylsiloxane, polymethylsiloxane, a copolymer of phenylmethylsiloxane and dimethylsiloxane, and the like.

A high viscosity silicone blending process is disclosed in U.S. Pat. No. 4,446,090 to E. M. Lovgren et al. The blends produced by the process are stated to have engineering properties and flame retardance superior to known blends. The process involves (a) melting a solid thermoplastic composition comprising one or more thermoplastic polymers within an extruder, (b) injecting a high viscosity silicone fluid into the molten thermoplastic composition within the extruder, and (c) blending said molten thermoplastic composition with said high viscosity silicone fluid within the extruder. The thermoplastic compositions include polyethylene and polypropylene. The silicone fluid typically is a polydimethylsiloxane. The blend can contain such additives as reinforcing fillers, antioxidants, lubricants, flame retardants, and the like. The additives can be introduced by means of the thermoplastic polymers, the silicone fluid, or both. Typical flame retardants include magnesium stearate, calcium stearate, barium stearate, antimony oxide, and decabromodiphenyloxide.

Siloxane-containing polymers are described in U.S. Pat. Nos. 4,480,009 and 4,499,149 to A. Berger. The properties of polymeric compositions are stated to be improved by the presence of a polysiloxane unit having a defined formula. The listing of polymers, however, does not include polyolefins. The disclosed compositions apparently are useful as protective coatings and as molding, extruding, laminating, and calendaring compositions. Solutions of the compositions can be used to prepare films and fibers.

U.S. Pat. No. 4,500,659 to L. A. Kroupa and E. H. Relyea relates to extrudable, curable polyorganosiloxane compositions. The compositions are similar to those of U.S. Pat. No. 4,585,830, described below. In the present case, the compositions comprise (A) a liquid triorganosiloxy end-blocked polydimethylsiloxane wherein the triorganosiloxy units are dimethylvinylsiloxy or methylphenylvinylsiloxy; (B) a reinforcing silica filler which has been reacted with a liquid or solubilized treating agent, at least one component of which is a liquid hydroxy end-blocked polyorganosiloxane wherein at least 50 percent of the silicon atoms are bonded to a fluorine-substituted hydrocarbon radical; (C) a liquid methylhydrogensiloxane having an average of at least three silicon-bonded hydrogen atoms per molecule; and (D) a platinum-containing catalyst. The bonded treating agent for the silica filler would be incompatible, i.e., insoluble, with the polydimethylsiloxane component if it were not bonded to the silica.

Olefin polymer compositions containing silicone additives are described in U.S. Pat. No. 4,535,113 to G. N. Foster and R. B. Metzler. The compositions apparently can be extruded through relatively narrow die gaps at commercial extrusion rates to provide films having improved optical and mechanical properties. The silicone additives have the formula,

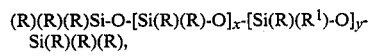

in which each R, which can be the same or different, is an alkyl radical preferably having from one to six carbon atoms, $R^1$ is a monovalent organic radical containing at least one ethyleneoxide group, vicinal epoxy group, or amino group, and x and y, which can be the same or different, each have a value of at least 1 and generally have a value of from about 4 to about 5,000. The silicone additives typically are present in the compositions in an amount of from about 0.01 to about 5 percent by weight.

U.S. Pat. No. 4,585,830 to R. P. Sweet describes polyorganosiloxane compositions useful for preparing unsupported extruded profiles. Such compositions are stated to include a triorganosiloxy end-blocked polydiorganosiloxane containing at least two vinyl radicals per molecule, in which at least 50 percent of the silicon-bonded organic radicals are methyl; and an organohydrogensiloxane containing at least two silicon-bonded hydrogen atoms per molecule, in which said hydrogen atoms are bonded to different silicon atoms. Examples of such two types of compounds are dimethylvinylsiloxy end-blocked polydimethylsiloxanes and trimethylsiloxy end-blocked dimethylsiloxane/methylhydrogensiloxane copolymers, respectively.

From the preceeding discussion, it is evident that there is a need for a single siloxane additive which will protect polymers and shaped articles made therefrom by both absorbing ultraviolet radiation and inhibiting actinic radiation-induced degradation, and which can be used as an additive in the surface-segregatable, melt-extrudable thermoplastic compositions of application Ser. No. 07/181,359.

SUMMARY OF THE INVENTION

It therefore is an object of the present invention to provide a novel siloxane which contains at least one benzotriazolyl/tetraalkylpiperidyl substituent.

It also is an object of the present invention to provide a novel siloxane which absorbs ultraviolet radiation and inhibits actinic radiation-induced degradation.

A further object of the present invention is to provide a novel siloxane which absorbs ultraviolet radiation, inhibits actinic radiation-induced degradation, and rapidly segregates to the surfaces of fibers and films in a controllable manner upon melt extrusion of a composition comprising at least one such siloxane and at least one thermoplastic polymer.

These and other objects will be apparent to those having ordinary skill in the art from a consideration of the specification and claims which follow.

Accordingly, the present invention provides a siloxane containing at least one benzotriazolyl/tetraalkylpiperidyl substituent and having the general formula, S-Z, in which S represents a siloxane moiety and Z represents a pendant benzotriazolyl/tetraalkylpiperidyl group attached by means of a divalent connecting group to a silicon atom, in which:

(A) the benzotriazolyl moiety is represented by the general formula,

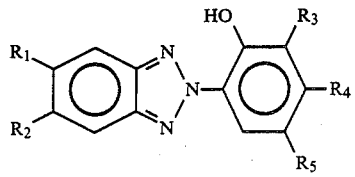

in which (1) $R_1$ is (a) a monovalent group selected from the group consisting of hydrogen and chloro; (b) a tetraalkylpiperidyl group; or (c) a divalent connecting group;

(2) $R_2$ is (a) a monovalent group selected from the group consisting of hydrogen, chloro, carboxy, sulfo, ethylsulfonyl, $C_1$-$C_8$ alkyl, $C_1$-$C_4$ alkoxy, vinylbenzyloxy, and alkoxycarbonyl in which the alkoxy moiety contains from 2 to 9 carbon atoms; (b) a tetraalkylpiperidyl group; or (c) a divalent connecting group;

(3) $R_3$ is (a) a monovalent group selected from the group consisting of hydrogen, chloro, carboxyethyl, $C_1$-$C_{14}$ alkyl, $C_1$-$C_4$ alkoxy, cyclopentyl, cyclohexyl, phenyl, phenyl substituted with $C_1$-$C_8$ alkyl groups, $C_7$-$C_9$ phenylalkyl, and alkoxycarbonyl in which the alkoxy moiety contains from 2 to 9 carbon atoms; (b) a tetraalkylpiperidyl group; or (c) a divalent connecting group;

(4) $R_4$ is a monovalent group selected from the group consisting of hydrogen, chloro, hydroxy, $C_1$-$C_4$ alkyl, $C_1$-$C_8$ alkoxy, and vinylbenzyloxy; and (5) $R_5$ is (a) a monovalent group selected from the group consisting of hydrogen, chloro, $C_1$-$C_{14}$ alkyl, cyclopentyl, cyclohexyl, and $C_7$-$C_9$ phenylalkyl; (b) a tetraalkylpiperidyl group; or (c) a divalent connecting group; and (B) the tetraalkylpiperidyl moiety is represented by the general formula,

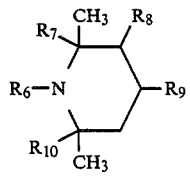

in which (1) $R_6$ is (a) a monovalent group selected from the group consisting of hydrogen; hydroxy; $C_1$-$C_{18}$ alkyl; $C_2$-$C_4$ hydroxyalkyl; $C_8$-$C_{12}$ phenylhydroxyalkyl; $C_3$-$C_8$ alkenyl; $C_7$-$C_{12}$ phenylalkyl; $C_1$-$C_8$ alkanoyl; $C_3$-$C_5$ alkenoyl; and -CO-N($R_{11}$)($R_{12}$), in which each of $R_{11}$ and $R_{12}$ is a monovalent group independently selected from the group consisting of hydrogen, $C_1$-$C_{18}$ alkyl, $C_3$-$C_{12}$ alkoxyalkyl, $C_2$-$C_8$ hydroxyalkyl, $C_3$-$C_{12}$ alkenyl, $C_7$-$C_{14}$ phenylalkyl, $C_6$-$C_{14}$ aryl, $C_7$-$C_{14}$ alkaryl, $C_3$-$C_7$ cycloalkyl, and 2,2,6,6,-tetramethyl-4-piperidyl; (b) a benzotriazolyl group; or (c) a divalent connecting group;

(2) $R_7$ is $C_1$-$C_5$ alkyl;

(3) $R_8$ is hydrogen or $C_1$-$C_5$ alkyl;

(4) $R_9$ is (a) a monovalent group selected from the group consisting of hydrogen; hydroxy; $C_1$-$C_{12}$ alkoxy; $C_3$-$C_{14}$ alkoxyalkoxy (oxaalkoxy); $C_3$-$C_5$ alkenoxy; poly(oxyethylene) having from 1 to 10 oxyethylene repeating units; carboxy; $C_1$-$C_{18}$ alkoxycarbonyl; $C_3$-$C_5$ alkenoxycarbonyl; $C_3$-$C_8$ cycloalkoxycarbonyl; $C_6$-$C_{10}$ aryloxycarbonyl; $C_7$-$C_{12}$ alkylaryloxycarbonyl; $C_7$-$C_{12}$ phenylalkoxycarbonyl; carboxymethyl; $C_1$-$C_{18}$ alkoxycarbonylmethyl; $C_3$-$C_5$ alkenoxycarbonylmethyl; $C_5$-$C_8$ cycloalkoxycarbonylmethyl; $C_6$-$C_{10}$ aryloxycarbonylmethyl; $C_7$-$C_{12}$ alkylaryloxycarbonylmethyl; $C_7$-$C_{12}$ phenylalkoxycarbonylmethyl; $C_2$-$C_{20}$ alkanoyloxy (alkoxycarbonyloxy); cyano; cyanomethyl; 2-cyanoethoxy;

-N($R_{13}$)($R_{14}$), in which each of $R_{13}$ and $R_{14}$ independently is a monovalent group selected from the group consisting of $C_1$-$C_{18}$ alkyl, $C_2$-$C_{14}$ alkoxyalkyl, $C_3$-$C_5$ alkenyl, $C_5$-$C_8$ cycloalkyl, $C_7$-$C_{12}$ phenylalkyl, $C_6$-$C_{10}$ aryl, $C_2$-$C_5$ hydroxyalkyl, and $C_7$-$C_{10}$ cycloalkylalkyl;

—$CH_2CH_2N(R_{13})(R_{14})$, in which $R_{13}$ and $R_{14}$ are as already defined;

—CO—N($R_{15}$)($R_{16}$), in which each of $R_{15}$ and $R_{16}$ independently is hydrogen, a group as defined for $R_{11}$ and $R_{12}$, or a monovalent group selected from the group consisting of $C_3$-$C_{12}$ alkoxyalkyl, $C_3$-$C_{12}$ alkenyl, $C_2$-$C_8$ hydroxyalkyl, $C_7$-$C_{14}$ phenylalkyl, $C_6$-$C_{14}$ aryl, and $C_7$-$C_{14}$ alkaryl;

—N($R_{17}$)—CO—$R_{18}$, in which $R_{17}$ is hydrogen or a group as defined for $R_{13}$ and $R_{14}$ and $R_{18}$ is a monovalent group selected from the group consisting of $C_1$-$C_{12}$ alkyl, $C_3$-$C_{14}$ alkoxyalkyl, $C_2$-$C_{14}$ alkyl which is substituted with carboxy or the $C_1$-$C_4$ alkyl ester thereof, $C_2$-$C_5$ alkenyl, $C_5$-$C_8$ cycloalkyl, $C_7$-$C_{12}$ phenylalkyl, $C_6$-$C_{10}$ aryl, and $C_7$-$C_{12}$ alkylaryl;

—O—CO—$R_{19}$, in which $R_{19}$ is a monovalent group selected from the group consisting of $C_1$-$C_{18}$ alkyl, $C_3$-$C_{14}$ alkoxyalkyl, $C_2$-$C_{14}$ alkyl which is substituted by carboxy or the $C_1$-$C_4$ alkyl ester thereof, $C_2$-$C_5$ alkenyl, $C_5$-$C_8$ cycloalkyl, $C_7$-$C_{12}$ phenylalkyl, $C_6$-$C_{10}$ aryl, $C_7$-$C_{12}$ alkylaryl, and phenyl or $C_7$-$C_{10}$ phenylalkyl which is substituted by hydroxy and 1-3 $C_1$-$C_4$ alkyl groups;

—N($R_{17}$)—CO—O—$R_{20}$, in which $R_{17}$ is as already defined and $R_{20}$ is a monovalent group selected from the group consisting of $C_1$-$C_{12}$ alkyl, $C_3$-$C_5$ alkenyl, $C_5$-$C_8$ cycloalkyl, phenyl, and $C_7$-$C_{12}$ phenylalkyl;

—O—CO—O—$R_{20}$, in which $R_{20}$ is as already defined; and

—O—CO—N($R_{21}$)($R_{22}$), in which each of $R_{21}$ and $R_{22}$ independently is hydrogen or a group as defined for $R_{13}$ and $R_{14}$; (b) a benzotriazolyl group; or (b) a divalent connecting group; and (5) $R_{10}$ is $C_1$-$C_5$ alkyl.

In preferred embodiments, the siloxane moiety comprises at least one tetrasubstituted disiloxanylene group, optionally associated with one or more groups selected from the group consisting of trisubstituted silyl and trisubstituted siloxy groups, the substituents of all such groups being independently selected from the group consisting of monovalent alkyl, cycloalkyl, aryl, and heterocyclic groups, each of which may be substituted or unsubstituted.

In other preferred embodiments, the benzotriazolyl/-tetraalkylpiperidyl-substituted siloxane contains a plurality of groups selected from the group represented by the following general formulae:

(1) Z—,
(2) Z—O—,
(3) $R_{23}$—,
(4) $R_{24}$—Si≡
(5) $(R_{25})(R_{26})(R_{27})$Si—,
(6) $(R_{28})(R_{29})(R_{30})$Si—O—,
(7) [—Si$(R_{31})(R_{32})$—O—]$_a$, and
(8) [—Si$(R_{33})(Z)$—O—]$_b$;

in which each of $R_{23}$ and $R_{24}$ independently is a monovalent group selected from the group consisting of hydrogen, alkyl, cycloalkyl, aryl, and heterocyclic groups, each of which, except for hydrogen, may be substituted or unsubstituted; each of $R_{25}$-$R_{27}$, inclusive, independently is a monovalent group selected from the group consisting of alkyl, cycloalkyl, aryl, and heterocyclic groups, each of which may be substituted or unsubstituted, and Z; each of $R_{28}$-$R_{33}$, inclusive, independently is a monovalent group selected from the group consisting of alkyl, cycloalkyl, aryl, and heterocyclic groups, each of which may be substituted or unsubstituted; each of a and b independently represents an integer from 0 to about 500 which indicates only the quantity of the respective group present in the additive without indicating or requiring, in instances when an integer is greater than 1, that such plurality of the respective group are connected to one another to form an oligomer or polymer or that all of such groups have identical substituents; and Z is as already defined; with the proviso that such plurality of groups results in at least one tetrasubstituted disiloxanylene group.

In yet other preferred embodiments, the siloxane is represented by the general formula,

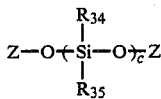

in which each of $R_{34}$ and $R_{35}$ independently is a monovalent group selected from the group consisting of hydrogen, alkyl, cycloalkyl, aryl, and heterocyclic groups, each of which, except for hydrogen, may be substituted or unsubstituted; Z is as already defined; and c represents an integer from 2 to about 500.

In still other preferred embodiments, the siloxane is represented by the general formula,

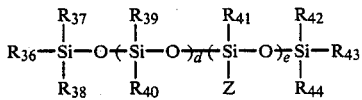

in which each of $R_{36}$-$R_{44}$, inclusive, independently is a monovalent group selected from the group consisting of hydrogen, alkyl, cycloalkyl, aryl, and heterocyclic groups, each of which, except for hydrogen, may be substituted or unsubstituted; Z is as already defined; and each of d and e independently represents an integer from 1 to about 500.

In yet other preferred embodiments, the siloxane is represented by the general formula,

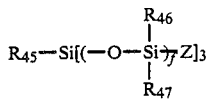

in which each of $R_{45}$-$R_{47}$, inclusive, independently is a monovalent group selected from the group consisting of hydrogen, alkyl, cycloalkyl, aryl, and heterocyclic groups, each of which, except for hydrogen, may be substituted or unsubstituted; Z is as already defined; and f represents an integer from 1 to about 500.

The siloxanes of the present invention are useful for imparting stability to fibers and films prepared by melt extrusion from thermoplastic compositions comprising at least one thermoplastic polymer and at at least one siloxane of the present invention. Upon melt-extrusion, the siloxanes of the present invention preferentially and rapidly segregate to the surfaces of the fibers and films in a controllable manner.

DETAILED DESCRIPTION OF THE INVENTION

As stated, the siloxane of the present invention, which contains at least one benzotriazolyl/tetraalkylpiperidyl substituent, can be represented by the general formula, S-Z, in which S represents a siloxane moiety and Z represents a pendant benzotriazolyl/tetraalkylpiperidyl group attached by means of a divalent connecting group to a silicon atom, in which:

(A) the benzotriazolyl moiety is represented by the general formula,

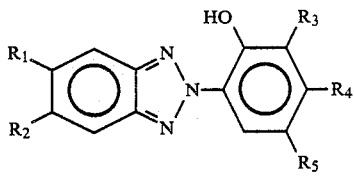

in which
(1) $R_1$ is (a) a monovalent group selected from the group consisting of hydrogen and chloro; (b) a tetraalkylpiperidyl group; or (c) a divalent connecting group;
(2) $R_2$ is (a) a monovalent group selected from the group consisting of hydrogen, chloro, carboxy, sulfo, ethylsulfonyl, $C_1$-$C_8$ alkyl, $C_1$-$C_4$ alkoxy, vinylbenzyloxy, and alkoxycarbonyl in which the alkoxy moiety contains from 2 to 9 carbon atoms; (b) a tetraalkylpiperidyl group; or (c) a divalent connecting group;
(3) $R_3$ is (a) a monovalent group selected from the group consisting of hydrogen, chloro, carboxyethyl, $C_1$-$C_{14}$ alkyl, $C_1$-$C_4$ alkoxy, cyclopentyl, cyclohexyl, phenyl, phenyl substituted with $C_1$-$C_8$ alkyl groups, $C_7$-$C_9$ phenylalkyl, and alkoxycarbonyl in which the alkoxy moiety contains from 2 to 9 carbon atoms; (b) a tetraalkylpiperidyl group; or (c) a divalent connecting group;
(4) $R_4$ is a monovalent group selected from the group consisting of hydrogen, chloro, hydroxy, $C_1$-$C_4$ alkyl, $C_1$-$C_8$ alkoxy, and vinylbenzyloxy; and
(5) $R_5$ is (a) a monovalent group selected from the group consisting of hydrogen, chloro, $C_1$-$C_{14}$ alkyl, cyclopentyl, cyclohexyl, and $C_7$-$C_9$ phenylalkyl; (b) a tetraalkylpiperidyl group; or (c) a divalent connecting group; and (B) the tetraalkylpiperidyl moiety is represented by the general formula,

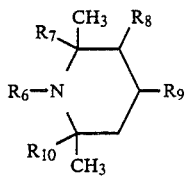

in which
(1) $R_6$ is (a) a monovalent group selected from the group consisting of hydrogen; hydroxy; $C_1$–$C_{18}$ alkyl; $C_2$–$C_4$ hydroxyalkyl; $C_8$–$C_{12}$ phenylhydroxyalkyl; $C_3$–$C_8$ alkenyl; $C_7$–$C_{12}$ phenylalkyl; $C_1$–$C_8$ alkanoyl; $C_3$–$C_5$ alkenoyl; and —CO—N($R_{11}$)($R_{12}$), in which each of $R_{11}$ and $R_{12}$ is a monovalent group independently selected from the group consisting of hydrogen, $C_1$–$C_{18}$ alkyl, $C_3$–$C_{12}$ alkoxyalkyl, $C_2$–$C_8$ hydroxyalkyl, $C_3$–$C_{12}$ alkenyl, $C_7$–$C_{14}$ phenylalkyl, $C_6$–$C_{14}$ aryl, $C_7$–$C_{14}$ alkaryl, $C_3$–$C_7$ cycloalkyl, and 2,2,6,6,-tetramethyl-4-piperidyl; (b) a benzotriazolyl group; or (c) a divalent connecting group;
(2) $R_7$ is $C_1$–$C_5$ alkyl;
(3) $R_8$ is hydrogen or $C_1$–$C_5$ alkyl;
(4) $R_9$ is (a) a monovalent group selected from the group consisting of hydrogen; hydroxy; $C_1$–$C_{12}$ alkoxy; $C_3$–$C_{14}$ alkoxyalkoxy (oxaalkoxy); $C_3$–$C_5$ alkenoxy; poly(oxyethylene) having from 1 to 10 oxyethylene repeating units; carboxy; $C_1$–$C_{18}$ alkoxycarbonyl; $C_3$–$C_5$ alkenoxycarbonyl; $C_3$–$C_8$ cycloalkoxycarbonyl; $C_6$–$C_{10}$ aryloxycarbonyl; $C_7C_{12}$ alkylaryloxycarbonyl; $C_7$–$C_{12}$ phenylalkoxycarbonyl; carboxymethyl; $C_1$–$C_{18}$ alkoxycarbonylmethyl; $C_3$–$C_5$ alkenoxycarbonylmethyl; $C_5$–$C_8$ cycloalkoxycarbonylmethyl; $C_6$–$C_{10}$ aryloxycarbonylmethyl; $C_7$–$C_{12}$ alkylaryloxycarbonylmethyl; $C_7$–$C_{12}$ phenylalkoxycarbonylmethyl; $C_2$–$C_{20}$ alkanoyloxy (alkoxycarbonyloxy); cyano; cyanomethyl; 2-cyanoethoxy;
—N($R_{13}$)($R_{14}$), in which each of $R_{13}$ and $R_{14}$ independently is a monovalent group selected from the group consisting of $C_1$–$C_{18}$ alkyl, $C_2C_{14}$ alkoxyalkyl, $C_3$–$C_5$ alkenyl, $C_5$–$C_8$ cycloalkyl, $C_7$–$C_{12}$ phenylalkyl, $C_6$–$C_{10}$ aryl, $C_2$–$C_5$ hydroxyalkyl, and $C_7$–$C_{10}$ cycloalkylalkyl;
—CH$_2$CH$_2$N($R_{13}$)($R_{14}$) in which $R_{13}$ and $R_{14}$ are as already defined;
—CO—N($R_{15}$ $R_{16}$), in which each of $R_{15}$ and $R_{16}$ independently is hydrogen, a group as defined for $R_{11}$ and $R_{12}$, or a monovalent group selected from the group consisting of $C_3$–$C_{12}$ alkoxyalkyl, $C_3$–$C_{12}$ alkenyl, $C_2$–$C_8$ hydroxyalkyl, $C_7$–$C_{14}$ phenylalkyl, $C_6$–$C_{14}$ aryl, and $C_7$–$C_{14}$ alkaryl;
—N($R_{17}$)—CO—$R_{18}$, in which $R_{17}$ is hydrogen or a group as defined for $R_{13}$ and $R_{14}$ and $R_{18}$ is a monovalent group selected from the group consisting of $C_1$–$C_{12}$ alkyl, $C_3$–$C_{14}$ alkoxyalkyl, $C_2$–$C_{14}$ alkyl which is substituted with carboxy or the $C_1$–$C_4$ alkyl ester thereof, $C_2$–$C_5$ alkenyl, $C_5$–$C_8$ cycloalkyl, $C_7$–$C_{12}$ phenylalkyl, $C_6$–$C_{10}$ aryl, and $C_7$–$C_{12}$ alkylaryl;
—O—CO—$R_{19}$, in which $R_{19}$ is a monovalent group selected from the group consisting of $C_1$–$C_{18}$ alkyl, $C_3$–$C_{14}$ alkoxyalkyl, $C_2$–$C_{14}$ alkyl which is substituted by carboxy or the $C_1$–$C_4$ alkyl ester thereof, $C_2$–$C_5$ alkenyl, $C_5$–$C_8$ cycloalkyl, $C_7$–$C_{12}$ phenylalkyl, $C_6$–$C_{10}$ aryl, $C_7$–$C_{12}$ alkylaryl, and phenyl or $C_7$–$C_{10}$ phenylalkyl which is substituted by hydroxy and 1-3 $C_1$–$C_4$ alkyl groups;
—N($R_{17}$)—CO—O—$R_{20}$, in which $R_{17}$ is as already defined and $R_{20}$ is a monovalent group selected from the group consisting of $C_1$–$C_{12}$ alkyl, $C_3$–$C_5$ alkenyl, $C_5$–$C_8$ cycloalkyl, phenyl, and $C_7$–$C_{12}$ phenylalkyl;
—O—CO—O—$R_{20}$, in which $R_{20}$ is as already defined; and
—O—CO—N($R_{21}$)($R_{22}$), in which each of $R_{21}$ and $R_{22}$ independently is hydrogen or a group as defined for $R_{13}$ and $R_{14}$; (b) a benzotriazolyl group; or (b) a divalent connecting group; and
(5) $R_{10}$ is $C_1$–$C_5$ alkyl.

$R_1$ is (a) a monovalent group selected from the group consisting of hydrogen and chloro; (b) a tetraalkylpiperidyl group; or (c) a divalent connecting group. $R_1$ preferably is hydrogen, a tetraalkylpiperidyl group, or a divalent connecting group.

$R_2$ is (a) a monovalent group selected from the group consisting of hydrogen, chloro, carboxy, sulfo, ethylsulfonyl, $C_1$–$C_8$ alkyl, $C_1$–$C_4$ alkoxy, vinylbenzyloxy, and alkoxycarbonyl in which the alkoxy moiety contains from 2 to 9 carbon atoms; (b) a tetraalkylpiperidyl group; or (c) a divalent connecting group. Preferably, $R_2$ is hydrogen, chloro, methyl, ethyl, methoxy, carboxy, a tetraalkylpiperidyl group, or a divalent connecting group.

$R_3$ is a monovalent group selected from the group consisting of hydrogen, chloro, carboxyethyl, $C_1$–$C_{14}$ alkyl, $C_1$–$C_4$ alkoxy, cyclopentyl, cyclohexyl, cycloheptyl, cyclooctyl, phenyl, phenyl substituted with $C_1$–$C_8$ alkyl groups, $C_7$–$C_9$ phenylalkyl, and alkoxycarbonyl in which the alkoxy moiety contains from 2 to 9 carbon atoms. Preferably, $R_3$ is hydrogen, chloro, methyl, sec-butyl, t-butyl, t-pentyl, t-octyl, α-methylbenzyl, or α,α-dimethylbenzyl.

$R_4$ is a monovalent group selected from the group consisting of hydrogen, chloro, hydroxy, $C_1$–$C_4$ alkyl, $C_1$–$C_8$ alkoxy, and vinylbenzyloxy. $R_4$ preferably is hydrogen.

$R_5$ is a monovalent group selected from the group consisting of hydrogen, chloro, $C_1$–$C_{14}$ alkyl, cyclopentyl, cyclohexyl, cycloheptyl, cyclooctyl, and $C_7$–$C_9$ phenylalkyl. Preferably, $R_5$ is $C_1$–$C_8$ alkyl, cyclohexyl, phenyl, chloro, α-methylbenzyl, or carboxyethyl.

As used herein, the term "divalent connecting group" is employed broadly to mean, without limitation, any divalent group known to those having ordinary skill in the art for covalently coupling one organic moiety to another, or an organic moiety to a silicon atom, provided that such divalent group is sufficiently thermally stable at melt-extrusion temperatures.

As a practical matter, the divalent connecting group will involve alkylene, ether, or amine linkages, examples of which are listed below:
—(CH$_2$)$_n$—, where n is an integer representing the number of repeating methylene groups - when an organic moiety is being connected to a silicon atom, n will have a value of at least 3;
—O—;
—O—$R_{48}$—, in which $R_{48}$ represents a divalent organic group, e.g., $C_1$–$C_{14}$ alkylene, cycloalkylene, and arylene;
—(CH$_2$)$_n$—O—, where n is as already defined;
—(CH$_2$)$_n$—O—$R_{48}$—, where n and $R_{48}$ are as already defined;
—NH—;

—N($R_{49}$)—, in which $R_{49}$ represents a monovalent organic group, e.g., $C_1$–$C_{14}$ alkyl;

—NH—$R_{50}$—, in which $R_{50}$ represents a divalent organic group, e.g., $C_1$–$C_{14}$ alkylene, cycloalkylene, and arylene; and —N($R_{51}$)—$R_{52}$—, in which $R_{51}$ represents a monovalent organic group, e.g., $C_1$–$C_{14}$ alkyl, and $R_{52}$ represents a divalent organic group, e.g., $C_1$–$C_{14}$ alkylene, cycloalkylene, and arylene.

Of the above, methylene and ether linkages are preferred when two organic moieties are being linked together, with methylene linkages being most preferred because of the higher thermal stability which is associated with such linkages. In addition, a nitrogen atom normally will not be directly coupled to a silicon atom. However, the above listing is representative only, and the selection of these and other coupling groups is well known to those having ordinary skill in the field of synthetic organic chemistry.

As used herein, the term "$C_1$–$C_8$ alkyl" includes, among others, methyl, ethyl, propyl, isopropyl, butyl, isobutyl, sec-butyl, t-butyl, pentyl, 1-methylbutyl, 2-methylbutyl, isopentyl, 1,2-dimethylpropyl, 2,2-dimethylpropyl, hexyl, 2-methylpentyl, 2,3-dimethylbutyl, 3-ethylbutyl, 3-methylpentyl, heptyl, 1-methylhexyl, isoheptyl, 1,2,2-trimethylbutyl, 2-ethylpentyl, octyl, 2-methylheptyl, isooctyl, t-octyl, 2,2,5-trimethylpentyl, 3-methylheptyl, and the like.

The term "$C_1$–$C_4$ alkoxy" includes methoxy, ethoxy, propoxy, isopropoxy, butoxy, isobutoxy, sec-butoxy, and t-butoxy. Similarly, examples of an alkoxy moiety which contains from 2 to 9 carbon atoms include, among others, methoxy, ethoxy, propoxy, isopropoxy, butoxy, isobutoxy, sec-butoxy, t-butoxy, pentyloxy, 2-methylbutyloxy, isopentyloxy, 1,2-dimethylpropyloxy, hexyloxy, 3-methylpentyloxy, 3,3-dimethylbutoxy, 2-ethylbutoxy,2-methylpentyloxy, heptyloxy, 1-methylhexyloxy, 3-methylhexyloxy, isoheptyloxy, 1,2,3-trimethylbutoxy, 2-ethylpentyloxy, octyloxy, 3-methylheptyloxy, isooctyloxy, 1,2,5-trimethylpentyloxy, 3-methylheptyloxy, nonyloxy, 2,2,5-trimethylhexyloxy, 1,1-dimethyl-3ethylpentyloxy, 4-methyloctyloxy, and the like.

The term "$C_1$–$C_{14}$ alkyl" includes all of the $C_1$–$C_8$ alkyl groups and such groups as nonyl, 2,2,5-trimethylhexyl, 1,3-dimethyl-3-ethylpentyl, 2-methyloctyl, decyl, isodecyl, 2,4-diethylhexyl, 5-methylnonyl, 3-ethyl-3-methylheptyl, undecyl, 7-methyldecyl, 8-ethylnonyl, 1,1-dimethylnonyl, 3-butylheptyl, dodecyl, 1,5-dimethyldecyl, 3,5-diethyloctyl, 2-propylnonyl, tridecyl, isotridecyl, 5-pentylocty-1,2,2,5,5-tetramethylnonyl, tetradecyl, isotetradecyl, 1,1-dimethyldodecyl, 1,1-diethyldecyl, 4-methyltridecyl, and the like.

As used herein, the term "$C_7$–$C_9$ phenylalkyl" includes benzyl, α-methylbenzyl, and α,α-dimethylbenzyl.

The term "$C_1$–$C_4$ alkyl" includes methyl, ethyl, propyl, isopropyl, butyl, isobutly, sec-butyl, and t-butyl. Included in the term "$C_1$–$C_8$ alkoxy" are the $C_1$–$C_4$ alkoxy groups, plus such groups as pentyloxy, 2-methylbutoxy, isopentyloxy, 1,2-dimethylpropoxy, hexyloxy, 3-methylpentyloxy, 3,3-dimethylbutoxy, 2-ethylbutoxy, 2-methylpentyloxy, heptyloxy, 1-methylhexyloxy, 3-methylhexyloxy, isoheptyloxy, 1,2,3-trimethylbutoxy, 2-ethylpentyloxy, 2-hydroxy-3-butoxypropoxy, octyloxy, 3-methylheptyloxy, isooctyloxy, 1,2,5-trimethylpentyloxy, 3-methylheptyloxy, and the like.

Compounds coming within the foregoing general formula for the benzotriazolyl moiety, less the divalent connecting group(s), as already stated, are known, as are procedures for preparing such compounds. See, by way of illustration, earlier-referenced U.S. Pat. Nos. 3,004,896, 3,055,896, 3,072,585, 3,074,910, 3,189,615, 3,230,194, 3,253,921, 3,983,132, 4,041,044, 4,096,242 4,127,586, 4,129,521, 4,226,763, 4,283,327, 4,278,590, 4,383,863, 4,414,393, and 4,447,511, each of which is incorporated herein by reference.

Because such compounds and their preparative methods are known, it is not neccessary to give synthetic details herein. In general, however, such compounds can be prepared by various methods, such as (1) by coupling a phenyldiazonium compound with a phenyl azo compound, followed by oxidation of the resulting o-aminoazo compound; or (2) by coupling an o-nitrophenyldiazonium compound with a phenol, followed by reduction with, e.g., ammonium sulfide or zinc in an alkaline medium.

Turning now to the tetraalkylpiperidyl moiety, $R_6$ is (a) a monovalent group selected from the group consisting of hydrogen; hydroxy; $C_1$–$C_{18}$ alkyl; $C_2$–$C_4$ hydroxyalkyl; $C_8$–$C_{12}$ phenylhydroxyalkyl; $C_3$–$C_8$ alkenyl; $C_7$–$C_{12}$ phenylalkyl; $C_1$–$C_8$ alkanoyl; $C_3$–$C_5$ alkenoyl; and —CO—N($R_{11}$)($R_{12}$), in which each of $R_{11}$ and $R_{12}$ is a monovalent group independently selected from the group consisting of hydrogen, $C_1$–$C_{18}$ alkyl, $C_3$–$C_{12}$ alkoxyalkyl, $C_2$–$C_8$ hydroxyalkyl, $C_3$–$C_{12}$ alkenyl, $C_7$–$C_{14}$ phenylalkyl, $C_6$–$C_{14}$ aryl, $C_7$–$C_{14}$ alkaryl, $C_3$–$C_7$ cycloalkyl, and 2,2,6,6,-tetramethyl-4-piperidyl; (b) a benzotriazolyl group,; or (c) a divalent connecting group. Preferably, $R_6$ is hydrogen, $C_1$–$C_{12}$ alkyl, allyl, benzyl, acetyl, acryloyl, a benzotriazolyl group, or a divalent connecting group.

Each of $R_7$ and $R_{10}$ independently is $C_1$–$C_5$ alkyl. $R_8$ can be either hydrogen or $C_1$–$C_5$ alkyl. As used herein, the term "$C_1$–$C_5$ alkyl" includes such groups as methyl, ethyl, propyl, isopropyl, butyl, isobutyl, sec-butyl, t-butyl, pentyl, 1-methylbutyl, 2-methylbutyl, isopentyl, 1,2-dimethylpropyl, 2,2-dimethylpropyl, and the like. Each of $R_7$ and $R_{10}$ preferably is methyl and $R_8$ preferably is hydrogen.

$R_9$ is (a) a monovalent group selected from the group consisting of hydrogen; hydroxy; $C_1$–$C_{12}$ alkoxy; $C_3$–$C_{14}$ alkoxyalkoxy (oxaalkoxy); $C_3$–$C_5$ alkenyloxy; poly(oxyethylene) having from 1 to 10 oxyethylene repeating units; carboxy; $C_1$–$C_{18}$ alkoxycarbonyl; $C_3$–$C_5$ alkenoxycarbonyl; $C_3C_8$ cycloalkoxycarbonyl; $C_6$–$C_{10}$ aryloxycarbonyl; $C_7$–$C_{12}$ alkylaryloxycarbonyl; $C_7$–$C_{12}$ phenylalkoxycarbonyl; carboxymethyl; $C_1$–$C_{18}$ alkoxycarbonyl methyl; $C_3$–$C_5$ alkenoxycarbonylmethyl; $C_5$–$C_8$ cycloalkoxycarbonylmethyl; $C_6$–$C_{10}$ aryloxycarbonylmethyl; $C_7$–$C_{12}$ alkylaryloxycarbonylmethyl; $C_7$–$C_{12}$ phenylalkoxycarbonylmethyl; $C_2$–$C_{20}$ alkanoyloxy (alkoxycarbonyloxy); cyano; cyanomethyl; 2-cyanoethoxy;

—N($R_{13}$)($R_{14}$), in which each of $R_{13}$ and $R_{14}$ independently is a monovalent group selected from the group consisting of $C_1$–$C_{18}$ alkyl, $C_2$–$C_{14}$ alkoxyalkyl, $C_3$–$C_5$ alkenyl, $C_5$–$C_8$ cycloalkyl, $C_7$–$C_{12}$ phenylalkyl, $C_6$–$C_{10}$ aryl, $C_2$–$C_5$ hydroxyalkyl, and $C_7$–$C_{10}$ cycloalkylalkyl;

—$CH_2CH_2N$($R_{13}$)($R_{14}$), in which $R_{13}$ and $R_{14}$ are as already defined;

—CO—N($R_{15}$)($R_{16}$), in which each of $R_{15}$ and $R_{16}$ independently is hydrogen, a group as defined for $R_{11}$ and $R_{12}$, or a monovalent group selected from the group consisting of $C_3-C_{12}$ alkoxyalkyl, $C_3-C_{12}$ alkenyl, $C_2-C_8$ hydroxyalkyl, $C_7-C_{C14}$ phenylalkyl, $C_6-C_{14}$ aryl, and $C_7-C_{14}$ alkaryl;

—$N(R_{17})$—CO—$R_{18}$, in which $R_{17}$ is hydrogen or a group as defined for $R_{13}$ and $R_{14}$ and $R_{18}$ is a monovalent group selected from the group consisting of C–$C_{12}$ alkyl, $C_3-C_{14}$ alkoxyalky, $C_2-C_{14}$ alkyl which is substituted with carboxy or the $C_1-C_4$ alkyl ester thereof, $C_2-C_5$ alkenyl, $C_5-C_8$ cycloalkyl, $C_7-C_{12}$ phenylalkyl, $C_6-C_{10}$ aryl, and $C_7-C_{12}$ alkylaryl;

—O—CO—$R_{19}$, in which $R_{19}$ is a monovalent group selected from the group consisting of $C_1-C_{18}$ alkyl, $C_3-C_{14}$ alkoxyalkyl, $C_2-C_{14}$ alkyl which is substituted by carboxy or the $C_1-C_4$ alkyl ester thereof, $C_2-C_5$ alkenyl, $C_5-C_8$ cycloalkyl, $C_7-C_{12}$ phenylalkyl, $C_6-C_{10}$ aryl, $C_7-C_{12}$ alkylaryl, and phenyl or $C_7-C_{10}$ phenylalkyl which is substituted by hydroxy and 1–3 $C_1-C_4$ alkyl groups;

—$N(R_{17})$—CO—O—$R_{19}$, in which $R_{17}$ is as already defined and $R_{20}$ is a monovalent group selected from the group consisting of $C_1-C_{12}$ alkyl, $C_3-C_5$ alkenyl, $C_5-C_8$ cycloalkyl, phenyl, and $C_7-C_{12}$ phenylalkyl;

—O—CO—O—$R_{20}$, in which $R_{20}$ is as already defined; and

—O—CO—$N(R_{21})(R_{22})$, in which each of $R_{21}$ and $R_{22}$ independently is hydrogen or a group as defined for $R_{13}$ and $R_{14}$; (b) a benzotriazolyl group; or (c) a divalent connecting group.

As used herein, the term "$C_1-C_{18}$ alkyl" includes, among others, methyl, ethyl, propyl, isopropyl, butyl, isobutyl, sec-butyl, t-butyl, pentyl, 1-methylbutyl, 2-methylbutyl, isopentyl, 1,2-dimethylpropyl, 2,2-dimethylpropyl, hexyl, 2-methylpentyl, 2,3-dimethylbutyl, 3-ethylbutyl, 3-methylpentyl, heptyl, 1-methylhexyl, isoheptyl, 1,2,2-trimethylbutyl, 2-ethylpentyl, octyl, 2-methylheptyl, isooctyl, 2-ethylhexyl, t-octyl, 2,2,5-trimethylpentyl, 3-methylheptyl, nonyl, 3-ethylhexyl, decyl, isodecyl, 3,3,5,5-tetramethylhexyl, undecyl, 1-methyldecyl, dodecyl, 2,4,6-trimethylnonyl, tridecyl, isotridecyl, tetradecyl, pentadecyl, 2-methyl-5-propyloctyl, t-pentadecyl, hexadecyl, isohexadecyl, heptadecyl, octadecyl and the like. Groups exemplified by the foregoing which have from 1 to 12 carbon atoms are encompassed by the term "$C_1-C_{12}$ alkyl".

As noted above, $C_2-C_{14}$ alkyl groups can be substituted by carboxy or the $C_1-C_4$ alkyl esters thereof to give such groups as 2-carboxyethyl, 2-methoxycarbonylbutyl, 3,4-bis(propoxycarbonyl)hexyl, 2-ethoxycarbonyldecyl, 2-carboxytetradecyl, 2-isopropoxycarbonyltetradecyl, and the like.

The term "$C_2-C_8$ hydroxyalkyl" is meant to include 1-hydroxyethyl, 2-hydroxyethyl, 2-hydroxypropyl, 3-hydroxypropyl, 1-methyl-2-hydroxyethyl, 2-hydroxybutyl, 3-hydroxybutyl, 4-hydroxybutyl, 2,3-dihydroxybutyl, hydroxy-t-butyl, 5-hydroxypentyl, 3-hydroxy-3-methylpentyl, 2,5-dihydroxyhexyl, 4-hydroxyheptyl, 8-hydroxyoctyl, and the like. The terms "$C_2-C_4$ hydroxyalkyl" and "$C_2-C_5$ hydroxyalkyl" include groups exemplified by the foregoing which have from 2 to 4 carbon atoms and from 2 to 5 carbon atoms, respectively.

The term "$C_8-C_{12}$ phenylhydroxyalkyl" includes 2-hydroxy-2-phenylethyl, 2-hydroxy-3-phenylpropyl, 2-hydroxy-2-phenylpropyl, 4-hydroxy-3-phenylbutyl, and the like.

The term "$C_2-C_{12}$ alkenyl" includes vinyl, allyl, isopropenyl, 2-methylallyl, 1-butenyl, 2-butenyl, 3-butenyl, 1,3-butadienyl, 3-pentenyl, 4-methyl-2-pentenyl, 2-hexenyl, 1-butyl-2-butenyl, 2,6-octadienyl, 1,5-dimethyl-1-vinyl-4-hexenyl, 2-nonenyl, 3,5-decadienyl, 9,9-dimethyl-4-nonenyl, 10-undecenyl, 2-dodecenyl, and the like. Also included within this group are compounds coming within the terms "$C_2-C_5$ alkenyl", "$C_3-C_5$ alkenyl", "$C_3-C_8$ alkenyl", and "$C_3-C_{12}$ alkenyl". Such compounds are readily exemplified by selecting members of the group "$C_2-C_{12}$ alkenyl" having the appropriate number of carbon atoms.

Included in the term "$C_7-C_{14}$ phenylalkyl" are benzyl, 2-phenylethyl, 3-phenylpropyl, 2-(p-tolyl)ethyl, 2-methyl 2-phenylpropyl, 4-phenylbutyl, 2-phenyl-3-methylbutyl, 5-phenylpentyl, 2,2-dimethyl-3-phenylpropyl, 4-phenylhexyl, 4-phenylheptyl, 3-phenyloctyl, 5-(m-tolyl)heptyl, and the like. Included within this group are the "$C_7-C_{12}$ phenylalkyl" groups, i.e., groups having 7–12 carbon atoms.

Substitution of $C_7-C_{10}$ phenylalkyl groups with hydroxy and 1–3 $C_1-C_4$ alkyl groups give rise to such groups as 4-hydroxy-3-methyl-5-t-butylbenzyl, 3-hydroxy-4-t-butylbenzyl, 2-(4-hydroxy-3,5-di-t-butylphenyl)ethyl, 2-(4-hydroxy-3,5-di-t-butyphenyl)-propyl, 3-(4-hydroxy-3,5-di-t-butylphenyl)-propyl, and the like. Similarly, substitutions of phenyl with hydroxy and 1–3 $C_1-C_4$ alkyl groups give rise to such groups as 4-hydroxy-3,5-di-t-butylphenyl, 2-hydroxy-4,6-dimethylphenyl, and the like.

The term "$C_l-C_8$ alkanoyl" includes formyl, acetyl, propionyl, lactoyl, isopropionyl, butyryl, sec-butyryl, 2-methylbutyryl, hexanoyl, 3-methylpentanoyl, 2-ethylpentanoyl, octanoyl, isooctanoyl, and the like.

The term "$C_2-C_{20}$ alkanoyloxy" includes acetoxy, propionoxy, hexanoyloxy, stearoyloxy, and the like.

The term "$C_3-C_5$ alkenoyl" is intended to include acryloyl, methacryloyl, 3-methylcrotonoyl, 1-butenoyl, 3-pentenoyl, and the like.

The term "$C_2-C_{14}$ alkoxyalkyl (oxaalkyl)" includes methoxymethyl, 1-methoxyethyl, ethoxymethyl, 2-ethoxyethyl, 2-isopropoxyethyl, butoxymethyl, 2,3-dimethoxybutyl, 2-hexyloxyethyl, 3,6-dioxaheptyl, 4-t-butoxybutyl, 3,7-dioxadecyl, 3,6,9-trioxadecyl, 5-ethoxydecyl, 4-isopropoxy-5-methylhexyl, 5-ethoxydecyl, 3-ethoxy-5,8-dioxanonyl, 2-methoxytridecyl, and the like. Exclusion of the methoxy-methyl group results in groups encompassed by the term "$C_3-C_{14}$ alkoxyalkyl (oxaalkyl)". Members of this group having 3–12 carbon atoms are included in the term "$C_3-C_{12}$ alkoxyalkyl (oxaalkyl)".

Included by the term "$C_6-C_{14}$ aryl" are such groups as phenyl, 1-naphthyl, 2-naphthyl, 2-anthryl, 9-anthryl, 3-phenanthryl, 10-phenanthryl, and the like. The term "$C_6-C_{10}$ aryl" is limited to phenyl and naphthyl groups.

The term "$C_7-C_4$ alkaryl" is intended to include such groups as 2-methylphenyl, 3-methylphenyl, 4-methylphenyl, 2,4-dimethylphenyl, 3-ethylphenyl, 4-isopropylphenyl, 3-pentylphenyl, 2-methyl-4-heptylphenyl, 4-methyl-2-naphthyl, 1-methyl-5-propyl-3-naphthyl, and the like. Members of this group having 7–12 carbon atoms are included in the term "$C_7-C_{14}$ alkylaryl".

The term "$C_3-C_8$ cycloalkyl" includes cyclopropyl, cyclobutyl, 2-methylcyclopropyl, cyclopentyl, cyclohexyl, 3-methylcyclopentyl, cycloheptyl, cyclooctyl, and the like. Members of this group having 3–7 carbon atoms and 5–8 carbon atoms are included by the terms "C$_3$–C$_7$ cycloalkyl" and "C$_5$–C$_8$ cycloalkyl", respectively.

Included in the term "C$_7$–C$_{10}$ cycloalkylalkyl" are such groups as 4-cyclopropylbutyl, 2-(2-methylcyclopropyl)-propyl, cyclohexylmethyl, 3-methylcyclopentylbutyl, cyclohexylpropyl, 4-methylcyclohexylbutyl, cycloheptylmethyl, cyclooctylethyl, and the like.

The term "C$_1$–C$_{12}$ alkoxy" includes methoxy, ethoxy, propoxy, isopropoxy, butoxy, isobutoxy, sec-butoxy, t-butoxy, pentyloxy, 2-methylbutoxy, isopentyloxy, 1,2-dimethylpropoxy, 2-hydroxy-3-butoxypropoxy, hexyloxy, 3-methylpentyloxy, 3,3-dimethylbutoxy, 2-ethylbutoxy, 2-methylpentyloxy, heptyloxy, 1-methylhexyloxy, 3-methyl-hexyloxy, isoheptyloxy, 1,2,3-trimethylbutoxy, 2-ethylpentyloxy, octyloxy, 3-methyl-heptyloxy, isooctyloxy, 1,2,5-trimethylpentyloxy, 3-methylheptyloxy, nonyloxy, 2,2,5-trimethylhexyloxy, 1,1-dimethyl-3-ethylpentyloxy, 4-methyloctyloxy, decyloxy, sec-decyloxy, 7,7-dimethyloctyloxy, undecyloxy, isoundecyloxy, dodecyloxy, and the like.

The term "C$_2$–C$_{14}$ alkoxyalkoxy (oxaalkoxy)" includes methoxymethoxy, 1-methoxyethoxy, ethoxymethoxy, 2-ethoxyethoxy, 2-isopropoxyethoxy, butoxymethoxy, 2,4-dimethoxybutoxy, 2-hexyloxyethoxy, 4-t-butoxybutoxy, 3,6-dioxaheptyloxy, heptyloxy, 3,7-dioxadecyloxy, 3,6,9-trioxadecyloxy, 4-isopropoxy-5-methylhexyloxy, 5-methylhexyloxy, 5-ethoxydecyloxy, 3-ethoxy-5,8-dioxanonyloxy, 2-methoxytridecyloxy, and the like.

Included in the term "C$_3$–C$_5$ alkenyloxy" are allyloxy, isopropenyloxy, 2-methylallyloxy, 1-butenyloxy, 2-butenyloxy, 3-butenyloxy, 1,3-butadienyloxy, 2-pentenyloxy, 3-methyl-2-butenyloxy, and the like.

The term "C$_1$–C$_{18}$ alkoxycarbonyl" includes, among others, methoxycarbonyl, ethoxycarbonyl, propoxycarbonyl, isopropoxycarbonyl, butoxycarbonyl, isobutoxycarbonyl, sec-butoxycarbonyl, t-butoxycarbonyl, pentyloxycarbonyl, 2-methylbutoxycarbonyl, 3-methylbutoxycarbonyl, isopentyloxycarbonyl, 1,2-dimethylpropoxycarbonyl, 2,2-dimethylpropoxycarbonyl, hexyloxycarbonyl, 2-methylpentyloxycarbonyl, 2,3-dimethylbutoxycarbonyl, 3-ethylbutoxycarbonyl, 2-methylpentyloxycarbonyl, heptyloxycarbonyl, 3-methylhexyloxycarbonyl, isoheptyloxycarbonyl, 1,3,3-trimethylbutoxycarbonyl, 2-ethylpentyloxycarbonyl, octyloxycarbonyl, 2-methylheptyloxycarbonyl, isooctyloxycarbonyl, 2-ethylhexyloxycarbonyl, t-octyloxycarbonyl, 2,2,5-trimethylpentyloxycarbonyl, 3-methylheptyloxycarbonyl, nonyloxycarbonyl, decyloxycarbonyl, isodecyloxycarbonyl, 3,3,5,5-tetramethylhexyloxycarbonyl, undecyloxycarbonyl, 1-methyldecyloxycarbonyl, dodecyloxycarbonyl, 2,5,7-trimethylnonyloxycarbonyl, tridecyloxycarbonyl, isotridecyloxycarbonyl, tetradecyloxycarbonyl, pentadecyloxycarbonyl, 2-methyl-4-propyloctyloxycarbonyl, t-pentadecyloxycarbonyl, hexadecyloxycarbonyl, isohexadecyloxycarbonyl, heptadecyloxycarbonyl, 2-ethyl-5-propyltridecyloxycarbonyl, octadecyloxycarbonyl, and the like. The term "C$_1$–C$_{18}$ alkoxycarbonylmethyl" includes members of the foregoing group as substituents on methyl groups, up to a total of 20 carbon atoms.

Included in the term "C$_3$–C$_5$ alkenyloxycarbonyl" are allyloxycarbonyl, propenyloxycarbonyl, isopropenyloxycarbonyl, 2-methylallyloxycarbonyl, 1-butenyloxycarbonyl, 2-butenyloxycarbonyl, 3-butenyloxycarbonyl, 1,3-butadienyloxycarbonyl, 2-pentenyloxycarbonyl, 3-pentenyloxycarbonyl, 3-methyl-2-butenyloxycarbonyl, and the like. The term "C$_3$–C$_5$ alkenyloxycarbonylmethyl" includes members of the foregoing group as substituents on methyl groups, up to a total of 7 carbon atoms.

The term "C$_3$–C$_8$ cycloalkoxycarbonyl" is meant to include cyclopropoxycarbonyl, cyclobutoxycarbonyl, 2-methylcyclopropoxycarbonyl, cyclopentyloxycarbonyl, cyclohexyloxycarbonyl, 2-methylcyclopentyloxycarbonyl, cycloheptyloxycarbonyl, cyclooctyloxycarbonyl, 2,4-dimethylcyclohexyloxycarbonyl, and the like. Excluding C$_3$–C$_4$ cycloalkoxycarbonyl groups from the foregoing gives rise to groups coming within the term "C$_5$–C$_8$ cycloalkoxycarbonyl".

The terms "C$_6$–C$_{10}$ aryloxycarbonyl" and "C$_7$–C$_{12}$ alkylaryloxycarbonyl" include phenoxycarbonyl, 4-methylphenoxycarbonyl, 3-ethylphenoxycarbonyl, 2,6-dimethylphenoxycarbonyl, 1-naphthyloxycarbonyl, 2-naphthyloxycarbonyl, 4-methyl-1-naphthyloxycarbonyl, 6,7-dimethyl-2-naphthyloxycarbonyl, and the like. The term "C$_6$–C$_{10}$aryloxycarbonylmethyl" includes members of the group "C$_6$–C$_{10}$ aryloxycarbonyl" as substituents on methyl groups, up to a total of 12 carbon atoms.

The term "C$_7$–C$_{12}$ phenylalkoxycarbonyl" is meant to include such groups as phenylmethoxycarbonyl, 2-phenylethoxycarbonyl, 2-phenylpropoxycarbonyl, 3-phenylpropoxycarbonyl, 2-(4-ethylphenyl)butoxycarbonyl, 5-phenylpentyloxycarbonyl, 4-phenylhexyloxycarbonyl, 6-phenylhexyloxycarbonyl, and the like. When members of this group are substituted on methyl groups, the resulting groups come within the term "C$_7$–C$_{12}$ phenylalkoxycarbonylmethyl".

Compounds coming within the foregoing general formula for the tetraalkylpiperidyl component, less the divalent connecting group(s), are known, as are procedures for preparing such compounds. See, by way of illustration, earlier-referenced U.S. Pat. Nos. U.S. Pat. Nos. 4,278,590, 4,299,926, 4,348,524, 4,472,547, 4,511,596, 4,569,997, 4,590,268, Re. 31,342, and Re. 31,343, each of which is incorporated herein by reference. See also, H. S. Mosher, "Piperidines and Partially Hydrogenated Pyridines," Chapter 9 in A. R. Katritzky and C. Rees, Editors, "Heterocyclic Compounds," Pergammon Press, Ill., 1984, pp. 617–676.

Briefly, piperidines can be prepared by the reduction of pyridine compounds or by ring closure reactions at a nitrogen atom or between carbon atoms. Ring closure reactions at a nitrogen atom can be with 1,5-dihalides, 1,5-aminohalides, 1,5-amino alcohols, 4,5-unstaurated amines, 1,5-diamines, or δ-aminocarbonyl compounds, or from the reduction of 1,3-dinitriles, 1,3-cyano esters, or 1,4-aminonitriles. Ring closure reactions between carbon atoms typically involve the Dieckmann condensation of suitable dicarboxylic esters or nitriles in which the ring closure is completed between the carbon atoms in the β,τ positions. Alternatively, ring closure be accomplished from several fragments by means of the Petrenko-Kritschenko reaction. Modifications of the piperidines then can be accomplished by a variety of methods, such as those described in the references cited above.

As already indicated, the other component of the compounds of the present invention is a siloxane moiety. Broadly stated, the siloxane moiety comprises at least one tetrasubstituted disiloxanylene group, optionally associated with one or more groups selected from the group consisting of trisubstituted silyl and trisubstituted siloxy groups, the substituents of all such groups being independently selected from the group consisting of monovalent alkyl, cycloalkyl, aryl, and heterocyclic groups, each of which may be substituted or unsubstituted. As a practical matter, the siloxane often will consist of all three groups. Moreover, more than one tetrasubstituted disiloxanylene group often will be present, particularly when the siloxane moiety has an appreciable molecular weight.

As used herein, the term "tetrasubstituted disiloxanylene group" means a group having the following general formula:

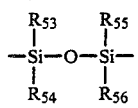

in which each of $R_{53}$-$R_{56}$, inclusive, is a monovalent group independently selected from the group consisting of alkyl, cycloalkyl, aryl, and heterocyclic groups.

As noted, the substituents of the groups comprising the siloxane moiety can be alkyl, cycloalkyl, aryl, or heterocyclic groups which may be the same or different and which, in turn, may be substituted or unsubstituted. Other than the obvious requirement that such substituents not adversely affect additive stability or other properties, there are no known limitations to such substituents. However, for reasons relating primarily to commercial availability and ease of synthesis, such substituents preferably are alkyl groups and more preferably are unsubstituted alkyl groups having from 1 to 3 carbon atoms. Most preferably, such substituents are methyl groups.

More specifically, the siloxane of the present invention preferably contains a plurality of groups selected from the group represented by the following general formulae, it being understood that not all groups need to be present and that the presence of some groups precludes the presence of others:

(1) $Z-$,
(2) $Z-O-$,
(3) $R_{23}-$,
(4) $R_{24}-Si\equiv$
(5) $(R_{25})(R_{26})(R_{27})Si-$,
(6) $(R_{28})(R_{29})(R_{30})Si-O-$,
(7) $[-Si(R_{31})(R_{32})-O-]_a$, and
(8) $[-Si(R_{33})(Z)-O-]_b$;

in which each of $R_{23}$ and $R_{24}$ independently is a monovalent group selected from the group consisting of hydrogen, alkyl, cycloalkyl, aryl, and heterocyclic groups, each of which, except for hydrogen, may be substituted or unsubstituted; each of $R_{25}$-$R_{27}$, inclusive, independently is a monovalent group selected from the group consisting of alkyl, cycloalkyl, aryl, and heterocyclic groups, each of which may be substituted or unsubstituted, and Z; each of $R_{28}$-$R_{33}$, inclusive, independently is a monovalent group selected from the group consisting of alkyl, cycloalkyl, aryl, and heterocyclic groups, each of which may be substituted or unsubstituted; each of a and b independently represents an integer from 0 to about 500 which indicates only the quantity of the respective group present in the additive without indicating or requiring, in instances when an integer is greater than 1, that such plurality of the respective group are connected to one another to form an oligomer or polymer or that all of such groups have identical substituents; and Z is as already defined; with the proviso that such plurality of groups results in at least one tetrasubstituted disiloxanylene group.

Molecular weight limitations, if desired, are readily achieved by limiting the sum of a and b to the extent required to achieve the desired molecular weight.

By way of illustration only, three especially preferred types of benzotriazolyl/tetraalkylpiperidyl-substituted siloxanes, identified hereinafter as type A, B, and C compositions, respectively, are described below with reference to the foregoing preferred groups.

Type A Compositions

The type A compositions consist of groups of formulae 1, 2, and 7, and can be represented by the general formula,

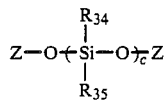

in which each of $R_{34}$ and $R_{35}$ independently is a monovalent group selected from the group consisting of hydrogen, alkyl, cycloalkyl, aryl, and heterocyclic groups, each of which, except for hydrogen, may be substituted or unsubstituted; Z is as already defined; and c represents an integer from 2 to about 500.

In a preferred group of type A compositions, each of $R_{34}$ and $R_{35}$ independently is an alkyl group containing from 1 to 3 carbon atoms and c is in the range of from 1 to about 100. Most preferably, each of $R_{34}$ and $R_{35}$ is methyl and c is in the range of from about 3 to about 60.

Type A additives in general are prepared by heating silicon with, e.g., chloromethane in the presence of a copper catalyst at about 300° C. to give dichlorodimethyl silane (see, e.g., U.S. Pat. No. 2,380,995 to E. G. Rochow) which, when reacted with water, gives a polymer having the following general formula:

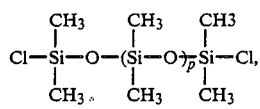

where p is an integer representing the number of repeating units in the molecule. See, for example, B. B. Hardman and A. Torkelson, "Encyclopedia of Chemical Technology," 3rd Edition, John Wiley & Sons, Inc., New York, 1982, pp. 922-962. The polymer then is reacted in the presence of trifluoroacetic acid with a hydroxy-substituted Z group to give the additive. See, by way of illustration of the reaction, U.S. Pat. No. 2,836,748 to D. L. Bailey and F. M. O'Connor. See also U.S. Pat. No. 2,917,480, U.S. Pat. No. 3,505,377 to E. L. Morehouse, and German Pat. No. 1,259,241.

Type B Compositions

The second type of compositions consists of groups of formulae 5-8, inclusive, and can be represented by the following general formula:

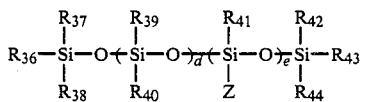

in which each of $R_{36}$-$R_{44}$, inclusive, independently is a monovalent group selected from the group consisting of hydrogen, alkyl, cycloalkyl, aryl, and heterocyclic groups, each of which, except for hydrogen, may be substituted or unsubstituted; Z is as already defined; and each of d and e independently represents an integer from 1 to about 500.

Preferably, each of $R_{36}$-$R_{44}$, inclusive, independently is an alkyl group containing from 1 to 3 carbon atoms, d is in the range of from 0 to about 100, and e is in the range of from 1 to about 50. Most preferably, each of $R_{36}$-$R_{44}$, inclusive, is methyl, d is in the range of from 0 to about 50, and e is in the range of from 1 to about 20.

The synthesis of type B additives begins with a reactive silicon fluid, prepared by known methods, such as that represented by the following formula:

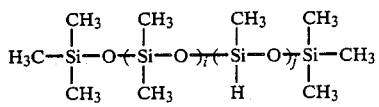

in which i and j are as already defined. The fluid is reacted with an allyl-substituted Z group to give the additive. The reaction is carried out in the presence of a platinum/τ-aluminum oxide catalyst at a temperature of the order of 150° C. See, e.g., U.S. Pat. Nos. 3,280,160 to D. L. Bailey, 3,178,899[?], also to D. L. Bailey, and 3,505,377 to E. L. Morehouse.

Type C Compositions

The type C compositions consist of groups of formulae 2, 4, and 7, and can be represented by the general formula,

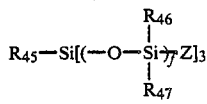

in which each of $R_{45}$-$R_{47}$, inclusive, independently is a monovalent group selected from the group consisting of hydrogen, alkyl, cycloalkyl, aryl, and heterocyclic groups, each of which, except for hydrogen, may be substituted or unsubstituted; Z is as already defined; and f represents an integer from 1 to about 500.

In a preferred group of type C compositions, each of $R_{45}$-$R_{47}$, inclusive, independently is an alkyl group containing from 1 to 3 carbon atoms and f is in the range of from 0 to about 50. Most preferably, each of $R_{45}$-$R_{47}$, inclusive, is methyl.

Type C additives are prepared by the method described in U.S. Pat. No. 2,836,748 to D. L. Bailey and F. M. O'Connor. Briefly, methyltriethoxysilane and mixed cyclic polydimethylsiloxanes are heated at about 150° C. in the presence of potassium hydroxide as catalyst to give a material having the following general formula:

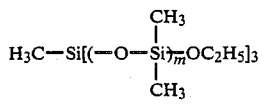

in which m is as already defined. This material then is reacted in the presence of trifluoroacetic acid with a hydroxy-substituted Z group to give the additive.

In general, the preparation of the siloxane moiety is well known to those having ordinary skill in the art. Siloxanes that have reactive groups, such as H—Si≡, RO—Si≡, and Cl—Si≡, are used as starting products. Such materials are prepared either by hydrolysis of, e.g., methylchlorosilanes or by copolymerization of cyclic or linear polymethylsiloxanes with functional siloxanes. See, for example, W. Noll, "Chemistry and Technology of Silicones," Academic Press, New York, 1968; and R. Meals, "Encyclopedia of Chemical Technology," Vol. 18, 2nd Edition, 1969, p. 221.

A benzotriazolyl/tetraalkylpiperidyl moiety then is coupled to the siloxane by known means. For example, the reactive siloxane can be converted to another siloxane having a different reactive group. As an illustration, the H—Si≡ group can be reacted with allyl glycidyl ether, in which case the new reactive group is an epoxide. The new reactive group then can be coupled to the benzotriazolyl/tetraalkylpiperidyl moiety by known means. Alternatively, the reactive siloxane can be combined directly with such moiety having at least one functional group which is reactive with the siloxane.

As noted earlier, the compounds of the present invention are especially useful as additives for the preparation of the surface-segregatable, melt-extrudable thermoplastic compositions described in cross-referenced application Ser. No. 07/181,359. Such compositions comprise at least one thermoplastic polymer and at least one additive. In general, the weight ratio of polymer to additive can vary from about 1 to about 1,000. That is, the amount of additive in such thermoplastic composition can range from about 50 percent by weight to about 0.1 percent by weight. Because the additive has a significant influence on the rheology of the melt, compositions containing greater amounts of polymeric material tend to be too fluid for melt-extrusion processes. On the other hand, lower amounts typically do not result in significant surface modification of the fiber or film prepared from the composition. As a point of interest, it was observed that although melt viscosities are reduced by inclusion of the additive in the polymer, friction within the extruder does not appear to be significantly affected if the extruder screw design is compatible with the compositions. This result is consistent with the formation of a metastable solution. But, such result is contrary to experience with other silicon-containing compounds known to have been incorporated in polymers and, thus, unexpected.

In melt-extrusion processes such as those used to prepare fibers and nonwoven webs, the weight ratio of polymer to additive preferably will be in the range of from about 6 to about 350. More preferably, such ratio will vary from about 9 to about 200, and most preferably from about 20 to about 200.

Such thermoplastic composition can be prepared by any number of methods known to those having ordinary skill in the art. For example, the polymer in chip or pellet form and the additive can be mixed mechanically to coat the polymer particles with additive. If desired, the additive can be dissolved in a suitable solvent to aid the coating process, although the use of a solvent is not preferred. The coated polymer then can be added to the feed hopper of the extruder from which the fibers or film will emerge. Alternatively, the coated polymer can be charged to a heated compounder, such as a heated twin-screw compounder, in order to disperse the additive throughout the bulk of the polymer. The resulting thermoplastic composition typically is extruded as rods which are fed to a chipper. The resulting chips then serve as the feed stock for a melt-processing extruder. In another method, the additive can be metered into the throat of the hopper which contains the polymer in particulate form and which feeds the extruder. In yet another method, the additive can be metered directly into the barrel of the extruder where it is blended with the molten polymer as the resulting mixture moves toward the die.

Such surface-segregatable, melt-extrudable composition is adapted to processing by melt extrusion to form a fiber or film having a differential, increasing concentration of the additive from the center to the surface thereof, such that the concentration of additive in at least one of the interfacial surface, effective surface, and subsurface of the fiber or film is greater than the average concentration of additive in the core of the fiber or film and imparts to the surface of the fiber or film at least one desired characteristic which otherwise would not be present. In the case of the compounds of the present additive, such characteristic is stability to actinic radiation as a consequence of the ability of such compounds to both absorb ultraviolet radiation and inhibit actinic radiation-induced degradation. The additive is miscible with the polymer at melt extrusion temperatures, under which conditions the additive and the polymer form a metastable solution. As the temperature of the newly formed fiber or film drops below melt extrusion temperatures, the additive becomes significantly less compatible with the polymer. Concurrent with this marked change in compatibility, the polymer begins to solidify. Both factors contribute to the migration or segregation of the additive which takes place rapidly and in a controllable manner.

As used herein, the interfacial surface in essence is the monomolecular layer of the fiber (or film) which is at the air/polymer (or nonfiber/fiber) interface. The effective surface begins at the interfacial surface and extends into the fiber a distance of about 15 Å. The subsurface lies below the effective surface and extends into the fiber to a depth of about 1,000 Å; thus, the subsurface has a thickness of about 985 Å. The remainder of the fiber which is below the subsurface is referred to as the core.

In order for the surface of a fiber or film to exhibit the desired characteristic which is not exemplified by the polymer in the absence of the additive, it is not necessary for the additive to be present at the interfacial surface. Rather, such desired characteristic will be observed if the additive is within about 15 Å of the interfacial surface because of the conformational changes in the additive which occur spontaneously at ambient conditions. Below about 15 Å, however, these conformational changes usually are not sufficient to make the additive effectively available at the interfacial surface.

Nevertheless, the presence of additive in the subsurface region is important because additive in that region often can be "coaxed" to move into the effective surface region by the application of gentle heat. Moreover, there are some characteristics which do not require the additive to be at either the interfacial surface or effective surface for the additive to be effective with respect thereto. By way of illustration only, examples of such characteristics include ultraviolet radiation stability and degradation inhibition.

In this regard, the term "gentle heat" generally means temperatures in the range of from about 45 to about 110° Celsius for periods of only a few seconds up to about a minute or so. Usually, additive present in the core region can be moved to the effective surface only under conditions which are closer to the prior art blooming procedure discussed earlier.

It should be noted that the term "bulk" is used herein differently from the term "core". As already pointed out, the latter term refers to that portion or region of the fiber or film which is below the subsurface layer or region. The term "bulk", on the other hand, has reference to the entire fiber or film and usually is employed in reference to elemental analyses of fiber or film samples.

As already stated, the surface-segregatable, melt-extrudable thermoplastic composition of the present invention comprises at least one thermoplastic polymer and at least one additive.

The term "melt-extrudable" is equivalent to "melt-processable" and is not intended to be limited in any way. That is, the term is intended to encompass the use of the composition in any melt-extrusion process which is or may be employed to prepare fibers or films. Thus, the term includes the use of the composition in melt-spinning of continuous filaments; meltblowing, spunbonding, and coforming of nonwoven webs; the casting and blowing of films; and the like.

The formation of nonwoven webs from such thermoplastic compositions is accomplished by known methods. For example, nonwoven webs may be formed by meltblowing in accordance with U.S. Pat. Nos. 3,016,599, 3,704,198, and 3,849,241; or by spunbonding in accordance with U.S. Pat. Nos. 3,361,394, 3,655,862, 3,705,068, 3,802,817, 3,853,651, 4,064,605, 4,405,297, and 4,434,204; or by coforming in accordance with U.S. Pat. No. 4,100,324.

In general, the term "thermoplastic polymer" is used herein to mean any thermoplastic polymer which can be used for the preparation of fibers or films. Examples of thermoplastic polymers include, by way of illustration only, end-capped polyacetals, such as poly(oxymethylene) or polyformaldehyde, poly(trichloroacetaldehyde), poly(n-valeraldehyde), poly(acetaldehyde), poly(propionaldehyde), and the like; acrylic polymers, such as polyacrylamide, poly(acrylic acid), poly(methacrylic acid), poly(ethyl acrylate), poly(methyl methacrylate), and the like; fluorocarbon polymers, such as poly(tetrafluoroethylene), perfluorinated ethylene-propylene copolymers, ethylene-tetrafluoroethylene copolymers, poly(chlorotrifluoroethylene), ethylene-chlorotrifluoroethylene copolymers, poly(vinylidene fluoride), poly(vinyl fluoride), and the like; polyamides, such as poly(6-aminocaproic acid) or poly($\epsilon$-caprolactam), poly(hexamethylene adipamide), poly(hexamethylene sebacamide), poly(11-aminoundecanoic acid), and the like; polyaramides, suoh as poly(imino-1,3-phenyleneiminoisophthaloyl) or poly(m-phenylene isophthalamide), and the like; parylenes, such as poly-p-xylylene, poly(chloro-p-xylylene), and the like; polyaryl ethers, such as poly(oxy-2,6-dimethyl-1,4-phenylene) or poly(p-phenylene oxide), and the like; polyaryl sulfones, such as poly(oxy-1,4-phenylenesulfonyl-1,4-phenyleneoxy-1,4-phenylene-isopropylidene-1,4-phenylene), poly(sulfonyl-1,4-phenyleneoxy-1,4-phenylenesulfonyl-4,4'-biphenylene), and the like; polycarbonates, such as poly(bisphenol A) or poly(carbonyldioxy-1,4-phenyleneisopropylidene-1,4-phenylene), and the like; polyesters, such as poly(ethylene terephthalate), poly(tetramethylene terephthalate), poly(cyclohexylene-1,4-dimethylene terephthalate) or poly(oxymethylene-1,4-cyclohexylenemethyleneoxyterephthaloyl), and the like; polyaryl sulfides, such as poly(p-phenylene sulfide) or poly(thio-1,4-phenylene), and the like; polyimides, such as poly-(pyromellitimido-1,4-phenylene), and the like; polyolefins, such as polyethylene, polypropylene, poly(1-butene), poly(2-butene), poly(1-pentene), poly(2-pentene), poly(3-methyl-1-pentene), poly(4-methyl-1-pentene), 1,2-poly-1,3-butadiene, 1,4-poly-1,3-butadiene, polyisoprene, polychloroprene, polyacrylonitrile, poly(vinyl acetate), poly(vinylidene chloride), polystyrene, and the like; copolymers of the foregoing, such as acrylonitrile-butadiene-styrene (ABS) copolymers, and the like; and the like.

The preferred polymers are polyolefins and polyesters, with polyolefins being more preferred. Even more preferred are those polyolefins which contain only hydrogen and carbon atoms and which are prepared by the addition polymerization of one or more unsaturated monomers. Examples of such polyolefins include, among others, polyethylene, polypropylene, poly(1-butene), poly(2-butene), poly(1-pentene), poly(2-pentene), poly(3-methyl-1-pentene), poly(4-methyl-1-pentene), 1,2-poly-1,3-butadiene, 1,4-poly-1,3-butadiene, polyisoprene, polystyrene, and the like. In addition, such termis meant to inolude blends of two or more polyolefins and random and block copolymers prepared from two or more different unsaturated monomers. Because of their commercial importance, the most preferred polyolefins are polyethylene and polypropylene.

Having thus described the invention, numerous changes and modifications thereof will be readily apparent to those having ordinary skill in the art without departing from the spirit or scope of the invention.

What is claimed is:

1. A siloxane containing at least one benzotriazolyl/-tetraalkylpiperidyl substituent and having the general formula, S-Z, in which S represents a siloxane moiety and Z represents a pendant benzotriazolyl/tetraalkylpiperidyl group attached by means of a divalent connecting group to a silicon atom, in which:

(A) the benzotriazolyl moiety is represented by the general formula,

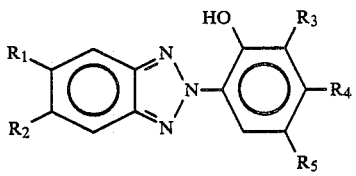

in which
(1) $R_1$ is (a) a monovalent goup selected from the group consisting of hydrogen and chloro; (b) a tetraalkylpiperidyl group; or (c) a divalent connecting group;
(2) $R_2$ is (a) a monovalent group selected from the group consisting of hydrogen, chloro, carboxy, sulfo, ethylsulfonyl, $C_1$–$C_8$ alkyl, $C_1$–$C_4$ alkoxy, vinylbenzyloxy, and alkoxycarbonyl in which the alkoxy moiety contains from 2 to 9 carbon atoms; (b) a tetraalkylpiperidyl group; or (c) a divalent connecting group;
$R_3$ is (a) a monovalent group selected from the group consisting of hydrogen, chloro, carboxyethyl, $C_1$–$C_{14}$ alkyl, $C_1$–$C_4$ alkoxy, cyclopentyl, cyclohexyl, phenyl, phenyl substituted with $C_1$–$C_8$ alkyl groups, $C_7$–$C_9$ phenylalkyl, and alkoxycarbonyl in which the alkoxy moiety contains from 2 to 9 carbon atoms; (b) a tetraalkylpiperidyl group; or (c) a divalent connecting group;

(4) $R_4$ is a monovalent goup selected from the group consisting of hydrogen, chloro, hydroxy, $C_1$–$C_{14}$ alkyl, $C_1$–$C_8$ alkoxy, and vinylbenzyloxy; and
(5) $R_5$ is (a) a monovalent group selected from the group consisting of hydrogen, chloro, carboxyethyl, $C_1$–$C_{14}$ alkyl, cyclopentyl, cyclohexyl, phenyl, and $C_7$–$C_9$ phenylalkyl; (b) a tetraalkylpiperidyl group; or
(c) a divalent connecting group; and
(B) the tetraalkylpiperidyl moiety is represented by the general formula,

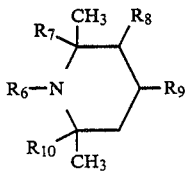

in which
(1) $R_6$ is (a) a monovalent group selected from the group consisting of hydrogen; hydroxy; $C_1$–$C_{18}$ alkyl; $C_2$–$C_4$ hydroxyalkyl; $C_8$–$C_{12}$ phenylhydroxyalkyl; $C_3$–$C_8$ alkenyl; $C_7$–$C_{12}$ phenylalkyl; $C_1$–$C_8$ alkanoyl; $C_3$–$C_5$ alkenoyl; and $-CO-N(R_{11})(R_{12})$, in which each of $R_{11}$ and $R_{12}$ is a monovalent group independently selected from the group consisting of hydrogen, $C_1$–$C_{18}$ alkyl, $C_3$–$C_{12}$ alkoxyalkyl, $C_2$–$C_8$ hydroxyalkyl, $C_3$–$C_{12}$ alkenyl, $C_7$–$C_{14}$ phenylalkyl, $C_6$–$C_{14}$ aryl, $C_7$–$C_{14}$ alkaryl, $C_3$–$C_7$ cycloakyl, and 2,2,6,6,-tetramethyl-4-piperidyl; (b) a benzotriazolyl group; or (c) a divalent connecting group;
(2) $R_7$ is $C_1$–$C_5$ alkyl;
(3) $R_8$ is hydrogen or $C_1$–$C_5$ alkyl;
(4) $R_9$ is (a) a monovalent group selected from the group consisting of hydrogen; hydroxy; $C_1$–$C_{12}$ alkoxy; $C_3$–$C_{14}$ alkoxyalkoxy (oxaalkoxy); $C_3$–$C_5$ alkenoxy; poly(oxyethylene) having from 1 to 10 oxyethylene repeating units; carboxy; $C_1$–$C_{18}$ alkoxycarbonyl; $C_3$–$C_5$ alkenoxycarbonyl; $C_3$–$C_8$ cycloalkoxycarbonyl; $C_6$–$C_{10}$ aryloxycarbonyl; $C_7$–$C_{12}$ alkylaryloxycarbonyl; $C_7$–$C_{12}$ phenylalkoxycarbonyl; carboxymethyl; $C_1$–$C_{18}$ alkoxycarbonylmethyl; $C_3$–$C_5$ alkenoxycarbonylmethyl; $C_5$–$C_8$ cycloalkoxycarbonylmethyl; $C_6$–$C_{10}$ aryloxycarbonylmethyl; $C_7$–$C_{12}$ alkylaryloxycarbonylmethyl; $C_7$–$C_{12}$ phenylalkoxycarbonylmethyl; $C_2$–$C_{20}$ alkanoyloxy (alkoxycarbonyloxy); cyano; cyanomethyl; 2-cyanoethoxy;
—$N(R_{13})(R_{14})$, in which each of $R_{13}$ and $R_{14}$ independently is a monovalent group selected from the group consisting of $C_1$–$C_{18}$ alkyl, $C_2$–$C_{14}$ alkoxyalkyl, $C_3$–$C_5$ alkenyl, $C_5$–$C_8$ cycloalkyl, $C_7$–$C_{12}$ phenylalkyl, $C_6$–$C_{10}$ aryl, $C_2$–$C_5$ hydroxyalkyl, and $C_7$–$C_{10}$ cycloakylalkyl;
—$CH_2CH_2N(R_{13})(R_{14})$, in which $R_{13}$ and $R_{14}$ are as already defined;
—$CO-N(R_{15})(R_{16})$, in which each of $R_{15}$ and $R_{16}$ independently is hydrogen, a group as defined for $R_{11}$ and $R_{12}$, or a monovalent group selected from the group consisting of $C_3$–$C_{12}$ alkoxyalkyl, $C_3$–$C_{12}$ alkenyl, $C_2$–$C_8$ hydroxyalkyl, $C_7$–$C_{14}$ phenylalkyl, $C_6$–$C_{14}$ aryl, and $C_7$–$C_{14}$ alkaryl;
—$N(R_{17})$—$CO$—$R_{18}$, in which $R_{17}$ is hydrogen or a group as defined for $R_{13}$ and $R_{14}$ and $R_{18}$ is a monovalent group selected from the group consisting of $C_1$–$C_{12}$ alkyl, $C_3$–$C_{14}$ alkoxyalkyl, $C_2$–$C_{14}$ alkyl which is substituted with carboxy or the $C_1$–$C_4$ alkyl ester thereof, $C_2$–$C_5$ alkenyl; $C_5$–$C_8$ cycloalkyl, $C_7$–$C_{12}$ phenylalkyl, $C_6$–$C_{10}$ aryl, and $C_7$–$C_{12}$ alkaryl;

—O—CO—$R_{19}$, in which $R_{19}$ is a monovalent group selected from the group consising of $C_1$–$C_{18}$ alkyl, $C_3$–$C_{14}$ alkoxyalkyl, $C_2$–$C_{14}$ alkyl which is substituted by carboxy or the $C_1$–$C_4$ alkyl ester thereof, $C_2$–$C_5$ alkenyl, $C_5$–$C_8$ cycloalkyl, $C_7$–$C_{12}$ phenylalkyl, $C_6$–$C_{10}$ aryl, $C_7$–$C_{12}$ alkylaryl, and phenyl or $C_7$–$C_{10}$ phenylalkyl which is substituted by hydroxy and 1–3 $C_1$–$C_4$ alkyl groups;

—N($R_{17}$)—CO—O—$R_{20}$, in which $R_{17}$ is as already defined and $R_{20}$ is a monovalent group selected from the group consisting of $C_1$–$C_{12}$ alkyl, $C_3$–$C_5$ alkenyl, $C_5$–$C_8$ cycloalkyl, phenyl, and $C_7$–$C_{12}$ phenylalkyl;

—O—CO—O—$R_{20}$, in which $R_{20}$ is as already defined; and —O—CO—N($R_{21}$)($R_{22}$), in which each of $R_{21}$ and $R_{22}$ independently is hydrogen or a group as defined for $R_{13}$ and $R_{14}$; (b) a benzotriazolyl group; or b) a divalent connecting group; and (5) $R_{10}$ is $C_1$–$C_5$ alkyl;
with the selection of (A)(1)-(A)(5) and (B)(1)-(B)(5) such that Z contains at least one benzotriazolyl moiety and at least one tetraalkylpiperidyl moiety, one of which is covalently coupled to a silicon atom of the siloxane moiety, S, by means of a divalent connecting group.

2. The siloxane of claim 1, in which $R_1$ is hydrogen, a tetraalkylpiperidyl group, or a divalent connecting group.

3. The siloxane of claim 1, in which $R_2$ is hydrogen, chloro, methyl, ethyl, methoxy, carboxy, a tetraalkylpiperidyl group, or a divalent connecting group.

4. The siloxane of claim 1, in which $R_3$ is hydrogen, chloro, methyl, sec-butyl, t-butyl, t-phentyl, t-octyl, α-methylbenzyl, or α,α-dimethylbenzyl.

5. The siloxane of claim 1, in which $R_4$ is hydrogen.

6. The siloxane of claim 1, in which $R_5$ is $C_1$–$C_8$ alkyl, cyclohexyl, phenyl, chloro, α-methylbenzyl, or carboxyethyl.

7. The siloxane of claim 1, in which $R_7$ is $C_1$–$C_3$ alkyl.

8. The siloxane of claim 7, in which $R_7$ is methyl.

9. The siloxane of claim 1, in which $R_8$ is hydrogen.

10. The siloxane of claim 1, in which $R_9$ is a divalent oonnecting group.

11. The siloxane of claim 1, in which $R_{10}$ is $C_1$–$C_3$ alkyl.

12. The siloxane of claim 11, in which $R_{10}$ is methyl.

13. The siloxane of claim 1, in which said siloxane moiety comprises at least one tetrasubstituted disiloxanylene group, optionally associated with one or more groups selected from the group consisting of trisubstituted silyl and trisubstituted siloxy groups, the substituents of all such groups being independently selected from the group consisting of monovalent alkyl, cycloalkyl, aryl, and heterocyclic groups, each of which may be substituted or unsubstituted.

14. The siloxane of claim 13, in which $R_1$ is hydrogen or a divalent connecting group.

15. The siloxane of claim 13, in which $R_2$ is hydrogen, chloro, methyl, ethyl, methoxy, carboxy, or a divalent connecting group.

16. The siloxane of claim 13, in which $R_3$ is hydrogen, chloro, methyl, sec-butyl, t-butyl, t-pentyl, t-octyl, α-methylbenzyl, or α,α-dimethylbenzyl.

17. The siloxane of claim 13, in which $R_4$ is hydrogen.

18. The siloxane of claim 13, in which $R_5$ is $C_1$–$C_8$ alkyl, cyclohexyl, phenyl, chloro, α-methylbenzyl, or carboxyethyl.

19. The siloxane of claim 13, in which $R_7$ is $C_1$–$C_3$ alkyl.

20. The siloxane of claim 19, in which $R_7$ is methyl.

21. The siloxane of claim 13, in which $R_8$ is hydrogen.

22. The siloxane of claim 13, in which $R_9$ is a divalent connecting group.

23. The siloxane of claim 13, in which $R_{10}$ is $C_1$–$C_3$ alkyl.

24. The siloxane of claim 23, in which $R_{10}$ is methyl.

25. The siloxane of claim 1, in which said siloxane contains a plurality of groups selected from the group represented by the following general formulae:
(1) Z—,
(2) Z—O—,
(3) $R_{23}$—,
(4) $R_{24}$—Si≡,
(5) ($R_{25}$)($R_{26}$)($R_{27}$)Si—,
(6) ($R_{28}$)($R_{29}$)($R_{30}$)Si—O—,
(7) [—Si($R_{31}$)($R_{32}$)—O—]$_a$, and
(8) [—Si($R_{33}$)(Z)—O—]$_b$;

in which each of $R_{23}$ and $R_{24}$ independently is a monovalent group selected from the group consisting of hydrogen, alkyl, cycloalkyl, aryl, and heterocyclic groups, each of which, except for hydrogen, may be substituted or unsubstituted; each of $R_{25}$–$R_{27}$, inclusive, independently is a monovalent group selected from the group consisting of alkyl, cycloalkyl, aryl, and heterocyclic groups, each of which may be substituted or unsubstituted, and Z; each of $R_{28}$–$R_{33}$, inclusive, independently is a monovalent group selected from the group consisting of alkyl, cycloalkyl, aryl, and heterocyclic groups, each of which may be substituted or unsubstituted; each of a and b independently represents an integer from 1 to about 500 which indicates only the quantity of the respective group present in the siloxane without indicating or requiring, in instances when an integer is greater than 1, that such plurality of the respective group are connected to one another to form an oligomer or polymer or that all of such groups have identical substituents; with the proviso that such plurality of groups results in at least one tetrasubstituted disiloxanylene group.

26. The siloxane of claim 25, in which $R_1$ is hydrogen or a divalent connecting group.

27. The siloxane of claim 25, in which $R_2$ is hydrogen, chloro, methyl, ethyl, methoxy, carboxy, or a divalent connecting group.

28. The siloxane of claim 25, in which $R_3$ is hydrogen, chloro, methyl, sec-butyl, t-butyl, t-pentyl, t-octyl, α-methylbenzyl, or α,α-dimethylbenzyl.

29. The siloxane of claim 25, in which $R_4$ is hydrogen.

30. The siloxane of claim 25, in which $R_5$ is $C_1$–$C_8$ alkyl, cyclohexyl, phenyl, chloro, α-methylbenzyl, or carboxyethyl.

31. The siloxane of claim 25, in which $R_7$ is $C_1$–$C_3$ alkyl.

32. The siloxane of claim 31, in which $R_7$ is methyl.

33. The siloxane of claim 25, in which $R_8$ is hydrogen.

34. The siloxane of claim 25, in which $R_9$ is a divalent connecting group.

35. The siloxane of claim 25, in which $R_{10}$ is $C_1$–$C_3$ alkyl.

36. The siloxane of claim 35, in which $R_{10}$ is methyl.

37. The siloxane of claim 1, in which said siloxane is represented by the general formula,

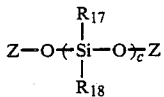

in which each of $R_{17}$ and $R_{18}$ independently is a monovalent group selected from the group consisting of hydrogen, alkyl, cycloalkyl, aryl, and heterocyclic groups, each of which, except for hydrogen, may be substituted or unsubstituted; and c represents an integer from 2 to about 500.

38. The siloxane of claim 37, in which $R_1$ is hydrogen or a divalent connecting group.

39. The siloxane of claim 37, in which $R_2$ is hydrogen, chloro, methyl, ethyl, methoxy, carboxy, or a divalent connecting group.

40. The siloxane of claim 37, in which $R_3$ is hydrogen, chloro, methyl, sec-butyl, t-butyl, t-pentyl, t-octyl, α-methylbenzyl, or α,α-dimethylbenzyl.

41. The siloxane of claim 37, in which $R_4$ is hydrogen.

42. The siloxane of claim 37, in which $R_5$ is $C_1$–$C_8$ alkyl, cyclohexyl, phenyl, chloro, α-methylbenzyl, or carboxyethyl.

43. The siloxane of claim 37, in which $R_7$ is $C_1$–$C_3$ alkyl.

44. The siloxane of claim 43, in which $R_7$ is methyl.

45. The siloxane of claim 37, in which $R_8$ is hydrogen.

46. The siloxane of claim 37, in which $R_9$ is a divalent connecting group.

47. The siloxane of claim 37, in which $R_{10}$ is $C_1$–$C_3$ alkyl.

48. The siloxane of claim 47, in which $R_{10}$ is methyl.

49. The siloxane of claim 1, in which said siloxane is represented by the general formula,

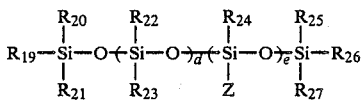

in which each of $R_{19}$–$R_{27}$, inclusive, independently is a monovalent group selected from the group consisting of hydrogen, alkyl, cycloalkyl, aryl, and heterocyclic groups, each of which, except for hydrogen, may be substituted or unsubstituted; and each of d and e independently represents an integer from 1 to about 500.

50. The siloxane of claim 49, in which $R_1$ is hydrogen or a divalent connecting group.

51. The siloxane of claim 49, in which $R_2$ is hydrogen, chloro, methyl, ethyl, methoxy, carboxy, or a divalent connecting group.

52. The siloxane of claim 49, in which $R_3$ is hydrogen, chloro, methyl, sec-butyl, t-butyl, t-pentyl, t-octyl, α-methylbenzyl, or α,α-dimethylbenzyl.

53. The siloxane of claim 49, in which $R_4$ is hydrogen.

54. The siloxane of claim 49, in which $R_5$ is $C_1$–$C_8$ alkyl, cyclohexyl, phenyl, chloro, α-methylbenzyl, or carboxyethyl.

55. The siloxane of claim 49, in which $R_7$ is $C_1$–$C_3$ alkyl.

56. The siloxane of claim 55, in which $R_7$ is methyl.

57. The siloxane of claim 49, in which $R_8$ is hydrogen.

58. The siloxane of claim 49, in which $R_9$ is a divalent connecting group.

59. The siloxane of claim 49, in which $R_{10}$ is $C_1$–$C_3$ alkyl.

60. The siloxane of claim 59, in which $R_{10}$ is methyl.

61. The siloxane of claim 1, in which said siloxane is represented by the general formula,

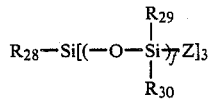

in which each of $R_{28}$–$R_{30}$, inclusive, independently is a monovalent group selected from the group consisting of hydrogen, alkyl, cycloalkyl, aryl, and heterocyclic groups, each of which, except for hydrogen, may be substituted or unsubstituted; and f represents an integer from 1 to about 500.

62. The siloxane of claim 60, in which $R_1$ is hydrogen or a divalent connecting group.

63. The siloxane of claim 60, in which $R_2$ is hydrogen, chloro, methyl, ethyl, methoxy, carboxy, or a divalent connecting group.

64. The siloxane of claim 60, in which $R_3$ is hydrogen, chloro, methyl, sec-butyl, t-butyl, t-pentyl, t-octyl, α-methylbenzyl, or α,α-dimethylbenzyl.

65. The siloxane of claim 60, in which $R_4$ is hydrogen.

66. The siloxane of claim 60, in which $R_5$ is $C_1$–$C_8$ alkyl, cyclohexyl, phenyl, chloro, α-methylbenzyl, or carboxyethyl.

67. The siloxane of claim 60, in which $R_7$ is $C_1$–$C_3$ alkyl.

68. The siloxane of claim 67, in which $R_7$ is methyl.

69. The siloxane of claim 60, in which $R_8$ is hydrogen.

70. The siloxane of claim 60, in which $R_9$ is a divalent connecting group.

71. The siloxane of claim 60, in which $R_{10}$ is $C_1$–$C_3$ alkyl.

72. The siloxane of claim 71, in which $R_{10}$ is methyl.

* * * * *